US012218889B2

(12) United States Patent
Lu et al.

(10) Patent No.: US 12,218,889 B2
(45) Date of Patent: Feb. 4, 2025

(54) ASYNCHRONOUS RESUMPTION OF DIALOG SESSION(S) BETWEEN A USER AND AN AUTOMATED ASSISTANT BASED ON INTERMEDIATE USER INTERACTION(S)

(71) Applicant: Google LLC, Mountain View, CA (US)

(72) Inventors: Wei Lu, San Jose, CA (US);
Wangmuge Qin, Santa Clara, CA (US);
Suleyman Yurekli, Zurich (CH);
Jeffrey Caesar, Campbell, CA (US);
Mikhail Turilin, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 94 days.

(21) Appl. No.: 17/094,669

(22) Filed: Nov. 10, 2020

(65) Prior Publication Data

US 2022/0094650 A1 Mar. 24, 2022

Related U.S. Application Data

(60) Provisional application No. 63/081,215, filed on Sep. 21, 2020.

(51) Int. Cl.
*H04L 51/02* (2022.01)
*G06F 3/16* (2006.01)

(52) U.S. Cl.
CPC .............. *H04L 51/02* (2013.01); *G06F 3/167* (2013.01)

(58) Field of Classification Search
CPC ........ H04L 51/02; H04L 51/046; G06F 3/167

USPC ........................................................ 715/727
See application file for complete search history.

(56) References Cited

U.S. PATENT DOCUMENTS

| 10,630,840 | B1 | 4/2020 | Karp et al. | |
|---|---|---|---|---|
| 2016/0042735 | A1* | 2/2016 | Vibbert | G10L 15/1822 704/257 |
| 2018/0196683 | A1* | 7/2018 | Radebaugh | G06F 16/3329 |
| 2018/0336905 | A1* | 11/2018 | Kim | G10L 17/22 |

(Continued)

OTHER PUBLICATIONS

European Patent Office; International Search Report and Written Opinion issued in PCT Application No. PCT/US2021/050804; 12 pages; dated Dec. 21, 2021.

(Continued)

*Primary Examiner* — Henry Orr
(74) *Attorney, Agent, or Firm* — Gray Ice Higdon

(57) ABSTRACT

Implementations can receive user input during a dialog session between a user and an automated assistant at a client device of the user and via an automated assistant platform, and in response to determining that the user input requires a user interaction with a non-assistant platform: store a state of the dialog session between the user and the automated assistant, transmit a request to initiate the user interaction to the non-assistant platform that causes an additional client device of the user to render a prompt for completing the user interaction, and receive a token associated with the user interaction from the non-assistant platform. In response to receiving the token associated with the user interaction, implementations can cause the dialog session between the user and the automated assistant to be resumed based on the stored state of the dialog session and based on the token associated with the user interaction.

19 Claims, 10 Drawing Sheets

(56) References Cited

U.S. PATENT DOCUMENTS

| | | |
|---|---|---|
| 2018/0358010 A1 | 12/2018 | Eidem et al. |
| 2019/0349477 A1 | 11/2019 | Kotak |
| 2020/0153821 A1 | 5/2020 | Cao et al. |
| 2021/0050009 A1* | 2/2021 | Lo .......................... G06F 40/30 |
| 2021/0090578 A1* | 3/2021 | Trapp ..................... G06F 21/44 |

OTHER PUBLICATIONS

Angelo, Joao; Interaction-Based Authentication for Alexa Skills with Auth0; Learn how to easily add interaction-based authentication for your Alexa skills with Auth0; Alexa; 35 pages; dated Apr. 27, 2017.

Initellectual Property India; Examination Report issued in Application No. 202327010044; 9 pages; dated 1 Oct. 5, 2023.

European Patent Office, Communication pursuant to Article 94(3) EPC; 6 pages; dated Jun. 28, 2024.

* cited by examiner

ASYNCHRONOUS RESUMPTION OF DIALOG SESSION(S) BETWEEN A USER AND AN AUTOMATED ASSISTANT BASED ON INTERMEDIATE USER INTERACTION(S)

BACKGROUND

Humans can engage in human-to-computer dialog sessions with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities. The input provided by the user can be, for example, spoken natural language input (i.e., utterances) which may in some cases be converted into text (or other semantic representation) and then further processed, and/or typed natural language input.

In some cases, automated assistants may include automated assistant clients that are executed locally by client devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), an audio recording of a spoken utterance of a user (or a text conversion thereof), and optionally data indicative of the user's identity (e.g., credentials). The cloud-based counterpart may perform various processing on the query to return result(s) to the automated assistant client, which may then provide corresponding output to the user.

Many users may engage automated assistants using multiple client devices. For example, some users may possess a coordinated "ecosystem" of client devices such as one or more smart phones, one or more tablet computers, one or more vehicle computing systems, one or wearable computing devices, one or more smart televisions, and/or one or more standalone interactive speakers, among other client devices. A user may engage in human-to-computer dialog sessions with an automated assistant using any of these client devices (assuming an automated assistant client is installed). In some cases, a given dialog session may be interrupted to perform other tasks, but the automated assistant may not be aware of the context of these other tasks when the given dialog session is resumed.

SUMMARY

Implementations described herein relate to suspending a dialog session between a user and an automated assistant, at a client device and via an automated assistant platform, in response to determining that user input received during the dialog session requires a user interaction with a non-assistant platform that is distinct from the automated assistant platform, and asynchronously resuming the dialog session between the user and the automated assistant, at the client device or an additional client device, and via the automated assistant platform, based on a stored state of the dialog session and based on a result of the user interaction with the non-assistant platform. When the dialog session is suspended, the automated assistant can cause a state of the dialog session to be stored in memory (e.g., of the client device) and/or one or more databases (e.g., of the client device and/or at a remote server), and can transmit a request to the non-assistant platform. The non-assistant platform can generate one or more prompts for completing the user interaction responsive to receiving the request, and can cause the one or more prompts to be rendered at the client device or an additional client device, and via the non-assistant platform. Additional user input can be received responsive to rendering of the one or more prompts to complete the user interaction, and one or more tokens associated with the user interaction can be generated. The automated assistant may then cause the dialog session to be resumed, at the client device or an additional client device, based on the stored state of the dialog session and based on the generated one or more tokens associated with the user interaction.

By suspending and asynchronously resuming the dialog sessions according to the techniques described herein, the dialog session can be resumed, via the automated assistant platform, using a context of the stored dialog session such that the user need not initiate a new dialog session to achieve a same dialog state before the dialog was suspended, thereby reducing user input(s) received at the client device and conserving computational resources. Further, suspending and storing the state enables the automated assistant at the client device to be utilized for other automated assistant dialog session(s), without affecting the stored state. The state can optionally be stored in local and/or remote non-volatile memory and, while stored, cleared from limited volatile memory, thereby enabling the volatile memory to be available for and/or used by other process(es). Yet further, the dialog session can be resumed, via the automated assistant platform, based on the one or more tokens associated with the user interactions completed via the non-automated assistant platform, thereby allowing the stored dialog session to progress beyond the stored state of the dialog session and to progress to a further state that is influenced by both the stored state and the token(s).

The automated assistant can determine that the user input requires the user interaction with the distinct non-assistant platform based on processing the user input. For example, assume the user input is a spoken utterance. The spoken utterance can be processed, using a speech-to-text module, to generate recognized text, and the recognized text can be processed, using a natural language processor to resolve an intent of the user included in the spoken utterance. Further assume the resolved intent of the user requires a user interaction to authenticate and/or verify a user account, enter credit card information, verify credit card information, etc., with a non-assistant platform to continue the dialog session. In response to determining that the user input requires the user interaction with the non-assistant platform, the automated assistant can store a state of the dialog session, and suspend the dialog. The stored state of the dialog session can include, for example, user input(s) provided by the user during the dialog session, response(s) provided by the automated assistant during the dialog session, context information associated with the dialog session (e.g., a location of the user, a time that the dialog session was initiated and/or suspended, a duration of the dialog session, etc.), a current intent of the user and/or current resolved slot value(s) for parameter(s) associated with the current intent, a past intent of the user and/or past resolved slot value(s) for parameter(s) associated with the past intent, and/or other data associated with the dialog session. Further, the automated assistant can cause an indication to be rendered at the client device that indicates the dialog session has been suspended so that the user can complete the user interaction. Notably, while the dialog session is suspended, the user may engage in other dialog sessions with the automated assistant and/or cause the automated assistant to perform assistant-based actions.

In some implementations, the non-assistant platform may be a first-party platform that shares a common publisher with the automated assistant. For example, the first-party platform can include an electronic mail platform, a navigation platform, an internet of things (IoT) device platform, a web-based platform, a software application platform, and/or other platform(s) that share the common publisher with the automated assistant. In some additional or alternative implementations, the non-assistant platform may be a third-party platform that does not share a common publisher with the automated assistant. For example, the third-party platform can include similar platform(s) as the first-party platforms listed above, but the third-party platform does not share the common publisher with the automated assistant. In other words, a platform can be a third-party platform in that it is controlled by a third-party corporate entity that is distinct from a first-party corporate entity that controls the assistant platform and over which the first-party does not exercise any direct control. Notably, the non-assistant platform may be utilized by the automated assistant in performing various actions. However, the automated assistant is not utilized in initiating or performing the user interaction with the non-assistant platform according to the techniques described herein.

In some implementations, the one or more prompts for completing the user interaction can be generated by the non-assistant platform responsive to receiving the request to initiate the user interaction via the non-assistant platform. The one or more prompts can be generated based on, for example, user input(s) provided by the user prior to suspending the dialog (or an intent determined based on the user input(s)) and/or response(s) provided by the assistant prior to suspending the dialog. Further, the one or more prompts can be transmitted as, for example, an electronic communication (e.g., a text message, an instant message, an email, and so on) associated with the non-assistant platform, a software application notification from a software application associated with the non-assistant platform, as part of data sent to an application programing interface associated with the non-assistant platform, and/or other representations.

In some versions of those implementations, the one or more prompts can be transmitted to the same client device where the dialog session was suspended, whereas in other versions of those implementations, the one or more prompts can be transmitted to an additional client device that is distinct from the client device where the dialog session was suspended. The one or more prompts can be transmitted to client device and/or the additional client device based on device capabilities. For example, if the user interaction requires a client device that includes a display, but the client device where the dialog session was suspended is a stand-alone speaker device that lacks a display, then the one or more prompts may be transmitted to an additional client device associated with the user that includes a display (e.g., a mobile device of the user). However, if the client device where the dialog session was suspended includes the display, then the one or more prompts may be transmitted back to the client device where the dialog session was suspended.

In some implementations, the one or more prompts may be rendered at the client device or the additional client device, and via the non-assistant platform, in response to receiving the one or more prompts. The one or more prompts can solicit additional user input responsive to the one or more prompts and to complete the user interaction at the client device or the additional client device. For example, the one or more prompts may solicit the additional user input to confirm account linking of a user account with the client device, enter new credit card information, verify current credit card information, confirm an address, check into lodging, tip a service provider, purchase game credits for a game, and/or other user interactions that authenticate and/or verify user information or transaction that may require a user to specify one or more values. In various implementations, the one or more prompts may additionally or alternatively require the user to provide biometric information in addition to, or in lieu of, the additional user input. The biometric information may include, for example, fingerprint verification of a fingerprint associated with the user that is detected via a fingerprint scanner, voice verification of a voice associated with the user that is detected via one or more microphones, face verification of a face associated with the user that is detected via one or more vision components, and/or other biometric information.

The one or more tokens can be, for example, data objects that include a result of the user interaction completed via the non-assistant platform, one or more values associated with the user interaction, and/or other information provided by the non-assistant platform. In various implementations, the result of the user interaction, on which the one or more tokens are generated, may be void of any data from the user interaction. For example, if the one or more prompts require fingerprint identification, the result of the interaction may indicate that the fingerprint of the user was identified, but actual fingerprint information may not be transmitted. Further, in various implementations, the one or more tokens can be encrypted to ensure user privacy. In some implementations, the one or more tokens can be generated by the non-assistant platform and transmitted back to the client device or an additional client device based on the additional user input. In some additional or alternative implementations, the additional user input can be transmitted to the client device and/or a remote computing device, and the client device and/or the remote computing device can generate the one or more tokens based on the additional user input. In some implementations, the one or more tokens can be stored in association with the stored state of the dialog session. The stored state of the dialog session and the one or more tokens stored in association with the stored state of the dialog can be accessible by a plurality of client devices over one or more networks.

The stored state of the dialog session can be loaded at the client device or an additional client device, and the dialog session may be resumed based on the one or more tokens. The one or more tokens may be required to resume the dialog session, and the resumption of the dialog session may differ based on the one or more tokens. For example, if a user is checking into lodging, and the dialog is prompted to verify a user account of the user, the user may also be prompted to purchase a particular television package for the stay at the lodging, including a choice between a normal television package and a premium television package. If the user purchases the normal television package, then the automated assistant may present a first television guide associated with the normal television package upon resumption of the dialog session. However, the user purchases the premium television package, then the automated assistant may present a second television guide associated with the premium television package upon resumption of the dialog session. Notably, there may be a temporal delay between a first time that the dialog session is suspended and a second time that the dialog session is resumed, hence the phrase asynchronous resumption of the dialog session. This temporal delay may range from a relatively short duration of time (e.g., a few seconds) to a relatively long duration of time (e.g., hours, days, weeks). It should be noted that the temporal delay between suspension and resumption of the dialog session may be based on when the user provides the additional user input responsive to the one or more prompts.

In some implementations, the dialog session may be automatically resumed at the client device in response to receiving the token(s). For example, the dialog session may be suspended at the client device in response to receiving the user input that requires the user interaction with the non-assistant platform, and remain suspended until the user interaction is completed at the client device. When the user interaction is completed at the client device (or the additional client device as described above), the suspended dialog session may be resumed at the client device. For example, receipt of the token(s) can cause the stored dialog state to be loaded into memory at the client device and the dialog session resumed and, optionally, the dialog session to be resumed in a further state that is in dependence on the stored state and the token(s) received. In some versions of those implementations, the dialog session may only be resumed at the client device if the user is present near the client device. In some further versions of those implementations, the client device at which the dialog session is resumed may be an additional client device that is distinct from the client device at which the dialog session was suspended and/or distinct from the additional client device at which the one or more prompts are rendered if rendered at the additional client device. For example, if the user is located amongst an ecosystem of multiple client devices that are capable of resuming the dialog session, then the dialog session loaded at a given one of the client devices nearest the user, and the dialog session may be resumed at the given client device based on the one or more tokens.

In some additional or alternative implementations, the dialog session may be resumed at the client device (or an additional client device) in response receiving, subsequent to receiving the token(s), user input to resume the dialog session subsequent to receiving the token. For instance, the dialog session may be suspended at the client device in response to receiving the user input that requires the user interaction with the non-assistant platform, and remain suspended until the user interaction is completed at the client device. When the user interaction is completed at the client device (or the additional client device as described above), one or more client devices in an ecosystem with multiple client device may provide an indication that the one or more tokens were received (e.g., an audible indication and/or a graphical element), and that the dialog session may be resumed based on the one or more tokens. However, the dialog session may not be resumed until the user input to resume the dialog is received. For example, in implementations where the client device includes the display, a selectable graphical element can be displayed and that, when selected by the user, causes the dialog session to be resumed at the client device. As another example, the client device may receive a spoken utterance that resumes the dialog session (e.g., "resume", "continue", and so on). In these examples, speech processing of the spoken utterance may be biased towards spoken utterances that resume the dialog if the token has been received at the client device.

The above description is provided as an overview of only some implementations of the present disclosure. Further description of those implementations, and other implementations, are described in more detail herein. As one non-limiting example, various implementations are described in more detail in the claims and detailed description included herein.

DETAILED DESCRIPTION

Figure 1:
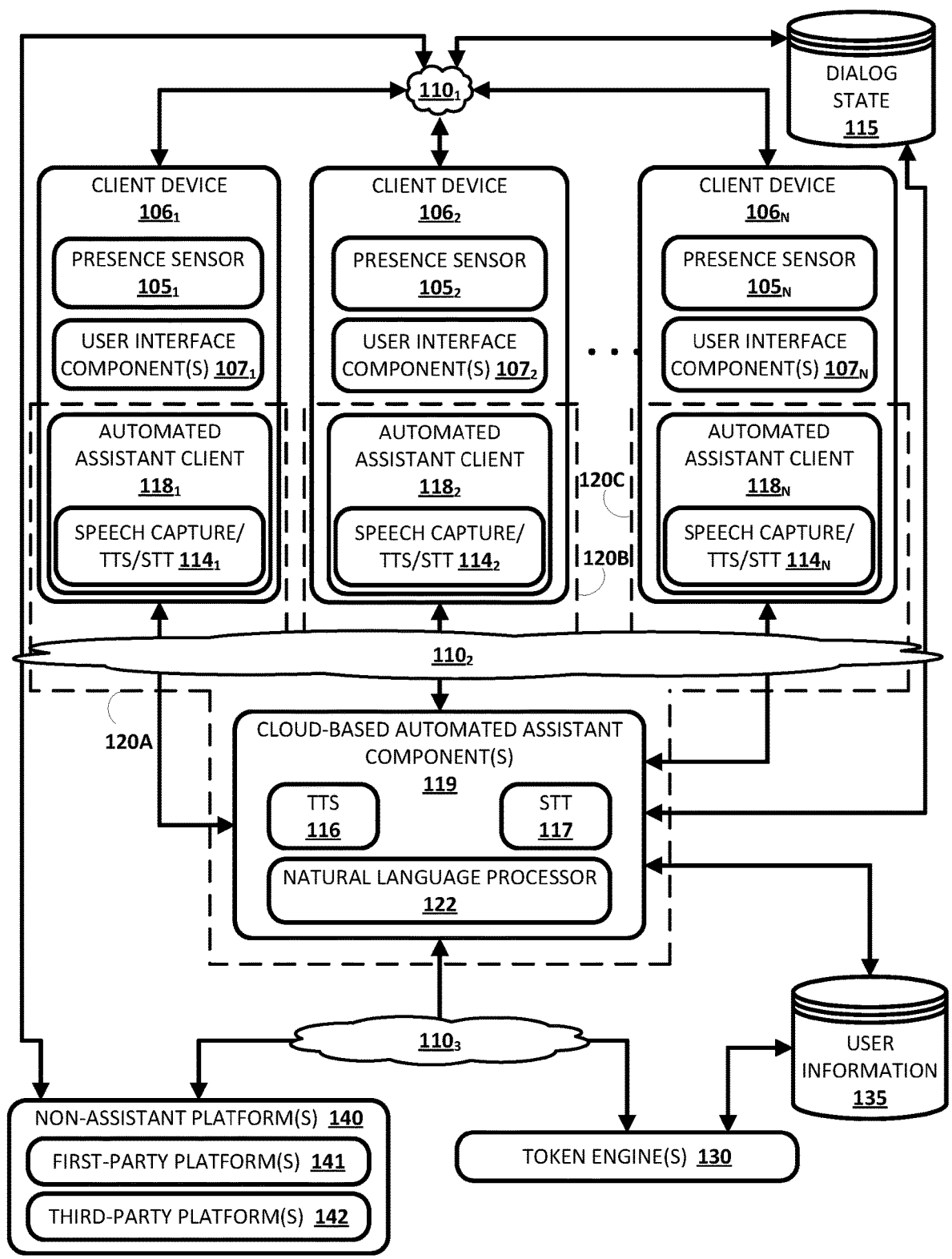
FIG. 1 is a block diagram of an example environment in which implementations disclosed herein may be implemented.

Turning to FIG. 1, an example environment in which techniques disclosed herein may be implemented is depicted. The example environment includes a plurality of client computing devices $106_{1-N}$ (also referred to herein simply as "client devices 106"), a dialog state database 115, one or more cloud-based automated assistant components 119, one or more token engines 130, one or more non-assistant platform(s) 140, and a user information database 135. The client devices 106 may be communicatively coupled with each other, the dialog state database 115, the non-assistant platform(s) 140, and/or other resources (e.g., the Internet) via one or more networks $110_1$, such as one or more wired or wireless local area networks ("LANs," including Wi-Fi LANs, mesh networks, BLUETOOTH®, near-field communication, etc.) and/or wide area networks ("WANs," including the Internet).

The client devices 106 may be, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

At least one of the client devices 106 can execute an automated assistant client 118. In some implementations, each of the client devices 106 can execute a respective instance of the automated assistant client 118 as depicted in FIG. 1. An instance of the automated assistant client 118 can be an application that is separate from an operating system of each of the client devices 106 (e.g., installed "on top" of the operating system)—or can alternatively be implemented directly by the operating system of each of the client devices 106. In other implementations, a subset of the client devices

106 may omit the automated assistant client 118. For example, a first client device 106₁ may include a respective instance of the automated assistant client 118, but a second client device 106₂ may omit a respective instance of the automated assistant client 118.

One or more cloud-based automated assistant components 119 can be implemented on one or more computing systems (collectively referred to as a "cloud" or a "remote" computing system) that are communicatively coupled to the client devices 106 via one or more LANs and/or WANs. The communicative coupling of the cloud-based automated assistant components 119 with the client devices 106 is indicated generally by 110₂ of FIG. 1. For example, the cloud-based automated assistant components 119 can be implemented by one or more servers in communication with the client devices 106.

The respective instance(s) of the automated assistant client 118 (and optionally by way of its interactions with the cloud-based automated assistant components 119) may form what appears to be, from a user's perspective, a logical instance of an automated assistant 120 with which the user may engage in a human-to-computer dialog. Three instances of such an automated assistant 120 are depicted in FIG. 1, and are generally referred to herein as "the automated assistant 120". A first automated assistant 120A encompassed by a dashed line includes automated assistant client 118₁ of client device 106₁ and optionally the cloud-based automated assistant components 119. A second automated assistant 120B encompassed by a dashed line includes automated assistant client 118₂ of client device 106₂ and optionally the cloud-based automated assistant components 119. A third automated assistant 120C encompassed by a dash-dash-dot line includes automated assistant client 118ₙ of client device 106ₙ and optionally the cloud-based automated assistant components 119. It thus should be understood that each user that engages with the automated assistant client 118 executing on the client devices 106 may, in effect, engage with his or her own logical instance of an automated assistant 120 (or a logical instance of automated assistant 120 that is shared amongst a household or other group of users). For the sake of brevity and simplicity, the term "automated assistant" as used herein will refer to the automated assistant client 118 executing on the client devices 106 and/or the cloud-based automated assistant components 119 (which may be shared amongst multiple automated assistant clients 118). Although only a plurality of associated client devices 106 are illustrated in FIG. 1, it is understood that cloud-based automated assistant component(s) 119 can also serve many additional groups of associated client devices.

In various implementations, the client devices 106 may include a respective presence sensor 105₁₋ₙ (also referred to herein simply as "the presence sensors 105") that is configured to provide, with approval from corresponding user(s), signals indicative of detected presence, particularly human presence. The presence sensors 105 may come in various forms. Some client devices 106 may be equipped with one or more digital cameras that are configured to capture and provide signal(s) indicative of movement detected in their fields of view. Additionally or alternatively, some client devices 106 may be equipped with other types of light-based presence sensors 105, such as passive infrared ("PIR") sensors that measure infrared ("IR") light radiating from objects within their fields of view. Additionally or alternatively, some client devices 106 may be equipped with presence sensors 105 that detect acoustic (or pressure) waves, such as one or more microphones.

Additionally or alternatively, in some implementations, the presence sensors 105 may be configured to detect other phenomena associated with human presence. For example, in some embodiments, a client device 106 may be equipped with a presence sensor 105 that detects various types of waves (e.g., radio, ultrasonic, electromagnetic, etc.) emitted by, for instance, a mobile device carried and/or operated by a particular user. For example, some of the client devices 106 may be configured to emit waves that are imperceptible to humans, such as ultrasonic waves or infrared waves, that may be detected by other client devices 106 (e.g., via ultrasonic/infrared receivers such as ultrasonic-capable microphones).

Additionally or alternatively, one or more of the client devices 106 may emit other types of human-imperceptible waves, such as radio waves (e.g., Wi-Fi, BLUETOOTH®, cellular etc.) that may be detected by other client devices 106 and used to determine an operating user's particular location. In some implementations, Wi-Fi triangulation may be used to detect a person's location, e.g., based on Wi-Fi signals to/from a client device 106. In other implementations, other wireless signal characteristics, such as time-of-flight, signal strength, etc., may be used by various client devices 106, alone or collectively, to determine a particular person's location based on signals emitted by a client device 106 they carry.

Additionally or alternatively, in some implementations, one or more of the client devices 106 may perform voice recognition to recognize an individual from their voice. For example, some automated assistants 120 may be configured to match a voice to a user's profile, e.g., for purposes of providing/restricting access to various resources. In some implementations, an individual may simply be assumed to be in the last location at which he or she engaged with automated assistant 120, especially if not much time has passed since the last engagement.

Each of the client devices 106 further include respective user interface component(s) 107₁₋ₙ (also referred to herein simply as "the user interface component(s) 107"), which can each include one or more user interface input devices (e.g., microphone, touchscreen, keyboard) and/or one or more user interface output devices (e.g., display, speaker, projector). The user interface component(s) may vary across the client devices. As one example, user interface components 107₁ can include only speaker(s) and microphone(s), whereas user interface components 107₂ can include speaker(s), a touchscreen, and microphone(s). As another example, user interface components 107₁ can include only speaker(s) and microphone(s), whereas user interface component 107₂ can include a fingerprint identification sensor.

Further, each of the client devices 106 and/or the cloud-based automated assistant components 119 may include one or more memories for storage of data and software applications, one or more processors for accessing data and executing applications, and other components that facilitate communication over the networks 110. The operations performed by one or more of the client computing devices 106 and/or by the automated assistant 120 may be distributed across multiple computer systems. The automated assistant 120 may be implemented as, for example, computer programs running on one or more computers in one or more locations that are coupled to each other through a network.

As noted above, in various implementations, one or more of the client devices 106 may operate the automated assistant client 118. In various embodiments, each automated assistant client 118 may include a corresponding speech capture/text-to-speech (TTS)/speech-to-text (STT) module 114. In other implementations, one or more aspects of speech capture/TTS/STT module 114 may be implemented separately from the automated assistant client 118.

Each speech capture/TTS/STT module 114 may be configured to perform one or more functions, including: capture a user's speech (speech capture, e.g., via a microphone (which in some cases may comprise one or more of the presence sensors 105)); convert that captured audio to text and/or to other representations or embeddings (STT); and/or convert text to speech (TTS). In some implementations, because each of the client devices 106 may be relatively constrained in terms of computing resources (e.g., processor cycles, memory, battery, etc.), the speech capture/TTS/STT module 114 that is local to each of the client devices 106 may be configured to convert a finite number of different spoken phrases to text (or to other forms, such as lower dimensionality embeddings). Other speech input may be sent to the cloud-based automated assistant components 119, which may include a cloud-based TTS module 116 and/or a cloud-based STT module 117.

The cloud-based STT module 117 may be configured to leverage the virtually limitless resources of the cloud to convert audio data captured by the speech capture/TTS/STT module 114 into text (which may then be provided to natural language processor 122). The loud-based TTS module 116 may be configured to leverage the virtually limitless resources of the cloud to convert textual data (e.g., text formulated by the automated assistant 120) into computer-generated speech output. In some implementations, the TTS module 116 may provide the computer-generated speech output to a respective one of the client devices 106 to be output directly, e.g., using one or more speakers. In other implementations, textual data generated by the automated assistant 120 may be provided to the speech capture/TTS/STT module 114, which may then locally convert the textual data into computer-generated speech that is rendered via local speaker(s).

The automated assistant 120 (and in particular, the cloud-based automated assistant components 119) may include a natural language processor 122, the aforementioned TTS module 116, the aforementioned STT module 117, and/or other components. In some implementations, one or more of the engines and/or modules of the automated assistant 120 may be omitted, combined, and/or implemented in a component that is separate from the automated assistant 120.

In some implementations, the automated assistant 120 generates responsive content in response to various inputs generated by a user of one of the client devices 106 during a human-to-computer dialog session with the automated assistant 120. The automated assistant 120 may provide the responsive content (e.g., over one or more networks when separate from a client device of a user) for presentation to the user as part of the dialog session. For example, automated assistant 120 may generate responsive content in response to receiving free-form natural language input provided via one of the client devices 106. As used herein, free-form input is input that is formulated by a user and that is not constrained to a group of options presented for selection by the user.

The natural language processor 122 of the automated assistant 120 processes the natural language input generated by users via client devices 106, and may generate annotated output for use by one or more other components of the automated assistant 120. For example, the natural language processor 122 may process natural language free-form input that is generated by a user via one or more user interface input components $107_1$ of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving the natural language input "buy them".

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related data outside of the particular natural language input to determine one or more annotations.

As described in more detail below (e.g., with respect to FIGS. 2, 3, 4A-4C, and 5A-5C), the automated assistant 120 may determine that user input received during a given human-to-computer dialog session requires a user interaction with one of the non-assistant platform(s) 140 based on processing the user input (e.g., as described with respect to 114, 117, 112). The non-assistant platform(s) 140 can include, for example, an electronic mail platform, a navigation platform, an internet of things (IoT) device platform, a web-based platform, a software application platform, and/or other platforms. If the automated assistant 120 determines that user input is received during the given dialog session requires the user interaction with a given one of the non-assistant platform(s) 140, the automated assistant 120 can store a state of the dialog in the dialog state database 115, and can suspend the dialog session. Further, if the automated assistant 120 may identify the given one of the non-assistant platform(s) 140 to be utilized to complete the user interaction. The given one of the non-assistant platform(s) 140 can be one or more first party platforms 141 or one or more third-party platforms 142. The first-party platform(s) 141 include platforms that share a common publisher with the automated assistant 120, whereas the third-party platform(s) 142 do not share the common publisher with the automated assistant 120. Further, the automated assistant 120 can generate a request to be transmitted to the given one of the non-assistant platform(s) 140 to complete the user interaction with the user. The request may be generated based on the user input and/or other dialog between the user and the automated assistant 120 provided during the dialog session. The automated assistant 120 can transmit the request to the identified given one of the non-assistant platform(s) 140.

The non-assistant platform(s) 140 can generate one or more prompts for completing the user interaction responsive to receiving the request to initiate the user interaction via the non-assistant platform(s) 140. The one or more prompts can be generated based on, for example, user input(s) provided by the user prior to suspending the dialog (or an intent determined based on the user input(s)) and/or response(s) provided by the assistant prior to suspending the dialog, and can solicit additional user input to complete the user interaction. Further, the one or more prompts can be transmitted as, for example, an electronic communication (e.g., a text message, an instant message, an email, and so on) associated with the non-assistant platform, a software application notification from a software application associated with the non-assistant platform, as part of data sent to an application programing interface associated with the non-assistant platform, and/or other representations.

The additional user input can be received responsive to rendering of one or more of the prompts. For example, the additional user input may be solicited to complete the user interaction. The user interaction can include, for example, confirming account linking of a user account with the client device 106, entering new credit card information, verifying current credit card information, confirming an address, checking into lodging, tipping a service provider, purchasing game credits for a game, and/or other user interactions that authenticate and/or verify user information or transaction that may require a user to specify one or more values. In various implementations, the one or more prompts may additionally or alternatively require the user to provide biometric information in addition to, or in lieu of, the additional user input. The biometric information may include, for example, fingerprint identification of a fingerprint associated with the user that is detected via a fingerprint scanner, voice identification of a voice associated with the user that is detected via one or more microphones, face identification of a face associated with the user that is detected via one or more vision components, and/or other biometric information. The additional user input received responsive to the one or more prompts rendered by the non-assistant platform(s) 140 can be transmitted to the token engine(s) 130.

The communicative coupling of the cloud-based automated assistant components 119 with the token engine(s) 130 and/or the non-assistant platform(s) 140 is indicated generally by $110_3$ of FIG. 1. For example, the token engine(s) 130 and/or the non-assistant platform(s) 140 can be implemented by one or more servers in communication with the client devices 106 and/or the cloud-based automated assistant components 119. Although depicted separately in FIG. 1, the token engine(s) 130 can be implemented by one or more of the client devices 106, the cloud-based automated assistant components 119, the non-assistant platform(s) 140 (e.g., as described with respect to FIG. 3), and/or at a remote system (e.g., one or more servers) that is separate from the above components. The token engine(s) 130 can generate one or more tokens based on a result of the user interaction with the non-assistant platform(s) 140. The one or more tokens can be, for example, data objects that include the result of the user interaction completed via the non-assistant platform(s) 140, one or more values associated with the user interaction, and/or other information provided by the non-assistant platform(s) 140. In various implementations, the result of the user interaction, on which the one or more tokens are generated, may be void of any data from the user interaction, and the one or more tokens can be encrypted to ensure user privacy. In some implementations, the one or more tokens can be generated by the non-assistant platform(s) 140 and transmitted back to the client devices 106, and can be stored in association with the stored state of the dialog session (e.g., in the dialog state database 115). The stored state of the dialog session and the one or more tokens stored in association with the stored state of the dialog can be accessible by one or more of the client devices 106 over one or more networks $110_1$.

The stored state of the dialog session can be loaded at a given one of the client devices 106, and the dialog session may be resumed based on the one or more tokens (e.g., as described in detail below with respect to FIGS. 4A-4C and 5A-5C). In some implementations, the one or more tokens may be required to resume the dialog session, and the resumption of the dialog session may be influenced based on the one or more tokens. For example, if a user is checking into lodging, and the dialog is prompted to verify a user account of the user, the user may also be prompted to purchase a particular television package for the stay at the lodging, including a choice between a normal television package and a premium television package. If the user purchases the normal television package, then the automated assistant may present a first television guide associated with the normal television package upon resumption of the dialog session. However, the user purchases the premium television package, then the automated assistant may present a second television guide associated with the premium television package upon resumption of the dialog session. Notably, there may be a temporal delay between a first time that the dialog session is suspended and a second time that the dialog session is resumed, hence the phrase asynchronous resumption of the dialog session. This temporal delay may range from a relatively short duration of time (e.g., a few seconds) to a relatively long duration of time (e.g., hours, days, weeks). It should be noted that the temporal delay between suspension and resumption of the dialog session may be based on when the user provides the additional user input responsive to the one or more prompts.

In some implementations, the dialog session may be automatically resumed at given one of the client devices 106 in response to receiving the token(s) from the token engine(s) 130 and/or the non-assistant platform(s) 140. For example, the dialog session may be suspended at the client device $106_1$ in response to receiving the user input that requires the user interaction with the non-assistant platform(s) 140, and remain suspended until the user interaction is completed via the non-assistant platform(s) 140

(and at the client device 106₁ or another one of the client devices 106). When the user interaction is completed, the suspended dialog session may be resumed at the client device 106₁ (or another one of the client devices 106). For example, receipt of the token(s) can cause the stored dialog state to be loaded into memory at the client device 106₁ (or another one of the client devices 106), and the dialog session resumed and, optionally, the dialog session to be resumed in a further state that is in dependence on the stored state and the token(s) received. In some versions of those implementations, the dialog session may only be resumed at the client device 106₁ if the user is present near the client device 106₁. In some further versions of those implementations, the client device at which the dialog session is resumed may be an additional client device (e.g., 106₂ or 106_N) that is distinct from the client device 106₁ at which the dialog session was suspended and/or distinct from the additional client device at which the one or more prompts are rendered if rendered at the additional client device.

In some additional or alternative implementations, the dialog session may be resumed at the client device 106₁ (or another one of the client devices 106) in response receiving, subsequent to receiving the one or more tokens, user input at the client device 106₁ (or another one of the client devices 106) to resume the dialog session subsequent to receiving the token. For instance, the dialog session may be suspended at the client device 106₁ in response to receiving the user input that requires the user interaction with the non-assistant platform(s) 140, and remain suspended until the user interaction is completed at the client device 106₁ (or another one of the client devices 106) and via the non-assistant platform(s) 140. When the user interaction is completed, one or more client devices in an ecosystem with multiple client devices (e.g., the client devices 106) may provide an indication that the one or more tokens were received (e.g., an audible indication and/or a graphical element), and that the dialog session may be resumed based on the one or more tokens. However, the dialog session may not be resumed until the user input to resume the dialog is received.

Although FIG. 1 is depicted as having a particular configuration of components implemented by the client devices 106 and/or servers communicating over particular networks, it should be understood that is for the sake of example and is not meant to be limiting. For instance, the client devices 106, the cloud-based automated assistant components 119, the token engine(s), and/or the non-assistant platform(s) 140 can communicate over a single network or any combination of networks. Further, the dialog states and the dialog state database 115 and/or the user information stored in the user information database 135 may be accessible over these networks. In implementations where data that includes the dialog states and/or the user information is transmitted over any of these networks, the data can be encrypted, filtered, or otherwise protected in any manner to ensure privacy of any user.

Figure 2:
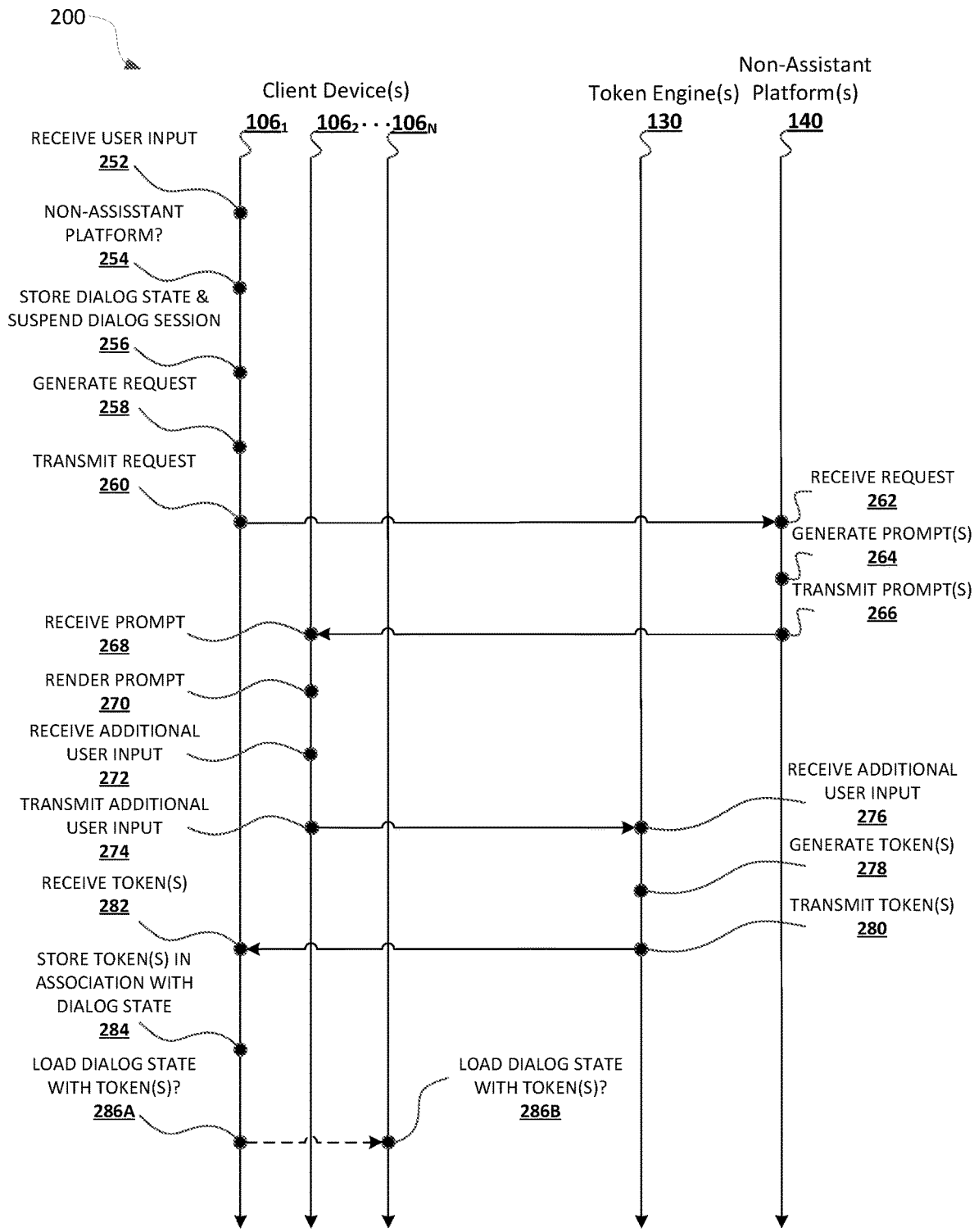
FIG. 2 illustrates an example state diagram, in accordance with various implementations.
Figure 3:
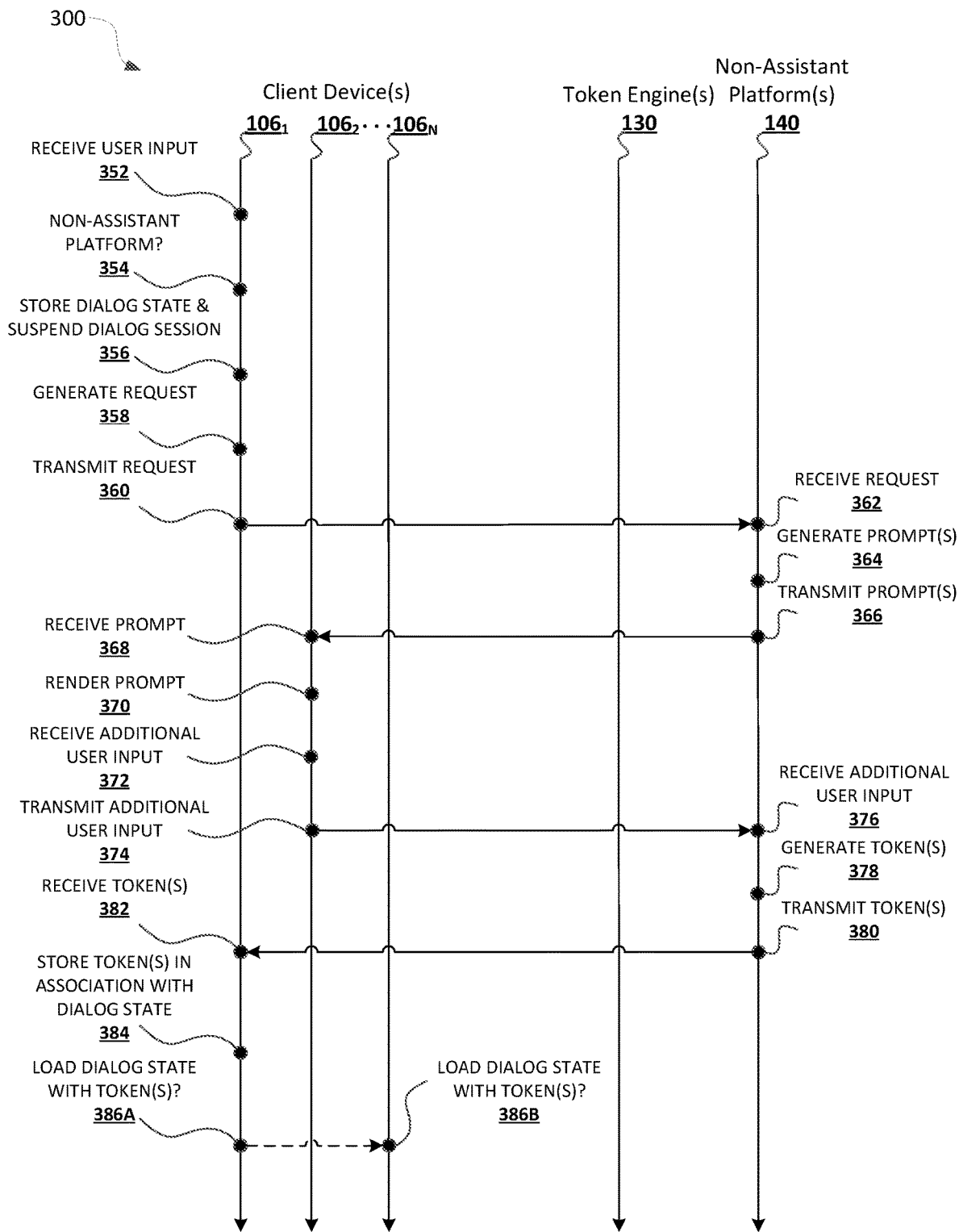
FIG. 3 illustrates another example state diagram, in accordance with various implementations.

Additional description of various components of FIG. 1 is now provided with reference to state diagram 200 of FIG. 2 and state diagram 300 of FIG. 3. For the sake of example, assume that a user associated with the client devices 106 (individually or part of a group) is currently engaged in a dialog session with the automated assistant 120 via an automated assistant platform (e.g., an automated assistant application) operating on the client device 106₁ at 252 of FIG. 2 and 352 of FIG. 3. Although the token engine(s) 130 is depicted in FIG. 3 as being implemented separate from the client devices 106, it should be understood that is for the sake of example and that one or more of the client devices 106 may include the token engine(s) 130. Further, although certain operations are described herein as being performed by certain devices, engine(s), and/or system(s), it should be understood that the operations described herein may be performed by the automated assistant 120.

In the state diagram 200 of FIG. 2, the client device 106₁ receives user input from a user of the client device 106₁ at 252 during the dialog session. The user input can be, for example, a spoken utterance, touch input, and/or typed input received at the client device 106₁ and from a user that may or may not be associated with the client device 106₁ prior to providing the user input.

At 254, the client device 106₁ determines whether the user input received at 252 requires a user interaction with a non-assistant platform that is distinct from the automated assistant platform. The non-assistant platform can be associated with a first-party that shares a common publisher with the automated assistant 120 (e.g., a first-party platform), or a third-party that does not share the common publisher with the automated assistant 120 (e.g., a third-party platform). The non-assistant platform can include, for example, a web-based platform (e.g., a web browser), an application-based platform (e.g., an IoT device application, a navigation application, an electronic mail application), and/or any other platform that is distinct from the automated assistant platform currently being utilized during the dialog session of FIG. 2. For example, assume the user input is a spoken utterance of a user. In this example, the automated assistant 120 can cause the spoken utterance to be processed (e.g., using the corresponding speech capture/text-to-speech (TTS)/speech-to-text (STT) module 114 of the client device 106₁ and/or the STT module 117 of the cloud-based automated assistant components) to generate recognized text corresponding to the spoken utterance. Further, the automated assistant can cause the natural language speech processor 122 to process the recognized text to determine an intent (e.g., action(s), and a respective slot value for parameter(s) associated with the action(s)) of the user based on the spoken utterance. If the client device 106₁ determines that user input (or an intent included therein) does not require a user interaction with a non-assistant platform, then the automated assistant 120 can continue the dialog session with the user based on the user input received at 252. However, if the client device 106₁ determines that user input (or an intent included therein) requires a user interaction with the non-assistant platform, then it can store a state of the dialog session in the dialog state database 115 and suspend the dialog session at 256. Notably, while the dialog is suspended, the client device 106₁ and/or the automated assistant 120 can still be utilized.

At 258, the client device 106₁ generates a request. The automated assistant 120 can generate the request based on the user input. The request can include, for example, an indication of the non-assistant platform and/or an indication of the user interaction to be completed via the non-assistant platform (e.g., determined based on the intent of the user).

At 260, the client device 106₁ transmits the request generated at 258 to the token engine(s) 130. In some implementations, the token engine(s) 130 may be implemented locally at the client device 106₁. In some additional or alternative implementations, the token engine(s) 130 may be implemented remotely at remote computing device(s) (e.g., one or more servers).

At 262, the non-assistant platform(s) 140 receives the request generated at the client device 106₁ at 258. At 264, the non-assistant platform(s) 140 generates one or more prompts based on the request received at 264. The one or more prompts can be generated based on, for example, the user input received at 252 (or an intent determined based on the user input) and/or responses rendered by the automated assistant 120 during the dialog session. Further, the one or more prompts can be transmitted as, for example, an electronic communication (e.g., a text message, an instant message, an email, and so on) associated with the non-assistant platform, a software application notification from a software application associated with the non-assistant platform, as part of data sent to an application programing interface associated with the non-assistant platform, and/or other representations. Notably, in these implementations the request transmitted from the client device $106_1$ indirectly causes one or more of the prompts to be rendered at the client device $106_2$.

At 266, the non-assistant platform(s) 140 transmits one or more of the prompts generated at 264 to client device $106_2$ of the user. Prior to transmitting the one or more prompts, the automated assistant 120 can determine where the request should be transmitted. In some implementations, the automated assistant 120 determines where to transmit the request based on device capabilities of the client device $106_1$ and/or other client devices in communication with the client device $106_1$ over one or more of the network $110_1$. For example, if the user interaction requires touch or typed input, but the client device $106_1$ lacks a display, then the one or more prompts may be transmitted to a different client device that does include a display (e.g., the client device $106_2$ as described in FIGS. 2 and 3). However, if the client device $106_1$ includes the display needed to complete the user interaction, then the one or more prompts can be transmitted back to the client device $106_1$. In some additional or alternative implementations, the automated assistant 120 determines where to transmit the request based on the user interaction required by the non-assistant platform.

At 268, the client device $106_2$ receives one or more of the prompts, and renders one or more of the prompts at 270 at the client device $106_2$. The client device $106_2$ can audibly and/or visually render the one or more prompts. How the client device $106_2$ renders the one or more prompts may be based on the type of the one or more prompts that are generated. For example, if the one or more prompts are included in an electronic communication, then the electronic communication can be transmitted to the client device $106_2$ as an email, a text message, an instance message, and so on. As another example, if the one or more prompts are included in a software application notification, then the notification can be transmitted to the client device $106_2$ as a pop-up notification, a banner notification, and/or any type of notification based on setting of the client device $106_2$.

At 272, the client device $106_2$ receives additional user input from the user of the client devices 106. The additional user input can be received responsive to rendering of one or more of the prompts at 270. For example, the additional user input may be solicited to complete the user interaction. The user interaction can include, for example, confirming account linking of a user account with the client device $106_1$, entering new credit card information, verifying current credit card information, confirming an address, checking into lodging, tipping a service provider, purchasing game credits for a game, and/or other user interactions that authenticate and/or verify user information or transaction that may require a user to specify one or more values. In various implementations, the one or more prompts may additionally or alternatively require the user to provide biometric information in addition to, or in lieu of, the additional user input. The biometric information may include, for example, fingerprint identification of a fingerprint associated with the user that is detected via a fingerprint scanner, voice identification of a voice associated with the user that is detected via one or more microphones, face identification of a face associated with the user that is detected via one or more vision components, and/or other biometric information.

At 274, the client device $106_2$ transmits the additional user input received at 272 to the token engine(s) 130. At 276, the token engine(s) 130 receives the additional user input. At 278, the token engine(s) 130 generates one or more tokens based on the additional user input. At 280, the token engine(s) 130 transmits one or more of the tokens to the client device $106_1$. The one or more tokens can be generated based on the additional user input. The one or more tokens can be, for example, data objects that include a result of the user interaction completed via the non-assistant platform, one or more values associated with the user interaction, and/or other information provided by the non-assistant platform. In other implementations, an instance of the token engine(s) 130 may be implemented at the client device $106_2$, and the token may be generated locally at the client device $106_2$. In those implementations, the token may be transmitted directly from the client device $106_2$ to the client device $106_1$.

At 282, the client device $106_1$ receives the one or more tokens transmitted at 280. At 284, the client device $106_1$ stores the one or more tokens in association with the dialog state stored at 256 (e.g., in the dialog state database 215). The automated assistant 120 may then load the stored state of the dialog session to resume the dialog session based on the one or more tokens at the client device $106_1$ at 286A (e.g., from the dialog state database 215). In some implementations, the dialog session may be resumed automatically in response to the client device $106_1$ receiving the one or more tokens, whereas in other implementations, the dialog may only be resumed in response to the further additional user input being received at the client device $106_1$ (e.g., as described in more detail with respect to FIGS. 4A-4C and 5A-5C). For example, if the dialog session was originally suspended at the client device $106_1$ because the user needed to purchase more game credits to continue playing a game, the dialog session may only be resumed in response to receiving the tokens that indicate the user purchased more game credits via a non-assistant platform, and the automated assistant 120 can automatically resume the game. In some additional or alternative implementations, the dialog state may be loaded at an additional client device $106_N$. In some versions of these implementations, the client device at which the dialog session is loaded may be a nearest client device to the user as indicated by the presence sensors. For example, assume that the user is closer to the client device $106_N$ than the client device $106_1$ when the token is received. In this example, the client device $106_N$ can load the state of the dialog session, and resume the dialog session based on the one or more tokens (e.g., as described with respect to FIGS. 5A-5C).

In the implementation of FIG. 2, the non-assistant platform(s) 140 may not include respective instances of the token engine(s) 130. However, in some implementations, the non-assistant platform(s) 140 can implement a respective instance of the token engine(s) 130. For example, in the state diagram 300 of FIG. 3, 352-372 may be the same or similar to 252-272, respectively, described above with respect to the state diagram 200 of FIG. 2. Further, 382, 384, 386A, and 386B may be the same or similar to 282, 284, 286A, and 286B, respectively, described above with respect to the state diagram 200 of FIG. 2. In contrast with FIG. 2, 376-380 may be performed by the non-assistant platform(s) 140 using the respective instance of the token engine(s) 130, and these steps may be performed in the same or similar manner as 276-280, respectively.

By suspending and asynchronously resuming the dialog sessions in the manner described with respect to FIGS. 2 and 3, the dialog session can be resumed, via the automated assistant platform, using a context of the stored dialog session such that the user need not initiate a new dialog session to achieve a same dialog state before the dialog was suspended, thereby reducing user input(s) received at the client device and conserving computational resources. Further, the dialog session can be resumed, via the automated assistant platform, based on the one or more tokens associated with the user interactions completed via the non-automated assistant platform, thereby allowing the stored dialog session to progress beyond the stored state of the dialog session.

Figure 4A:
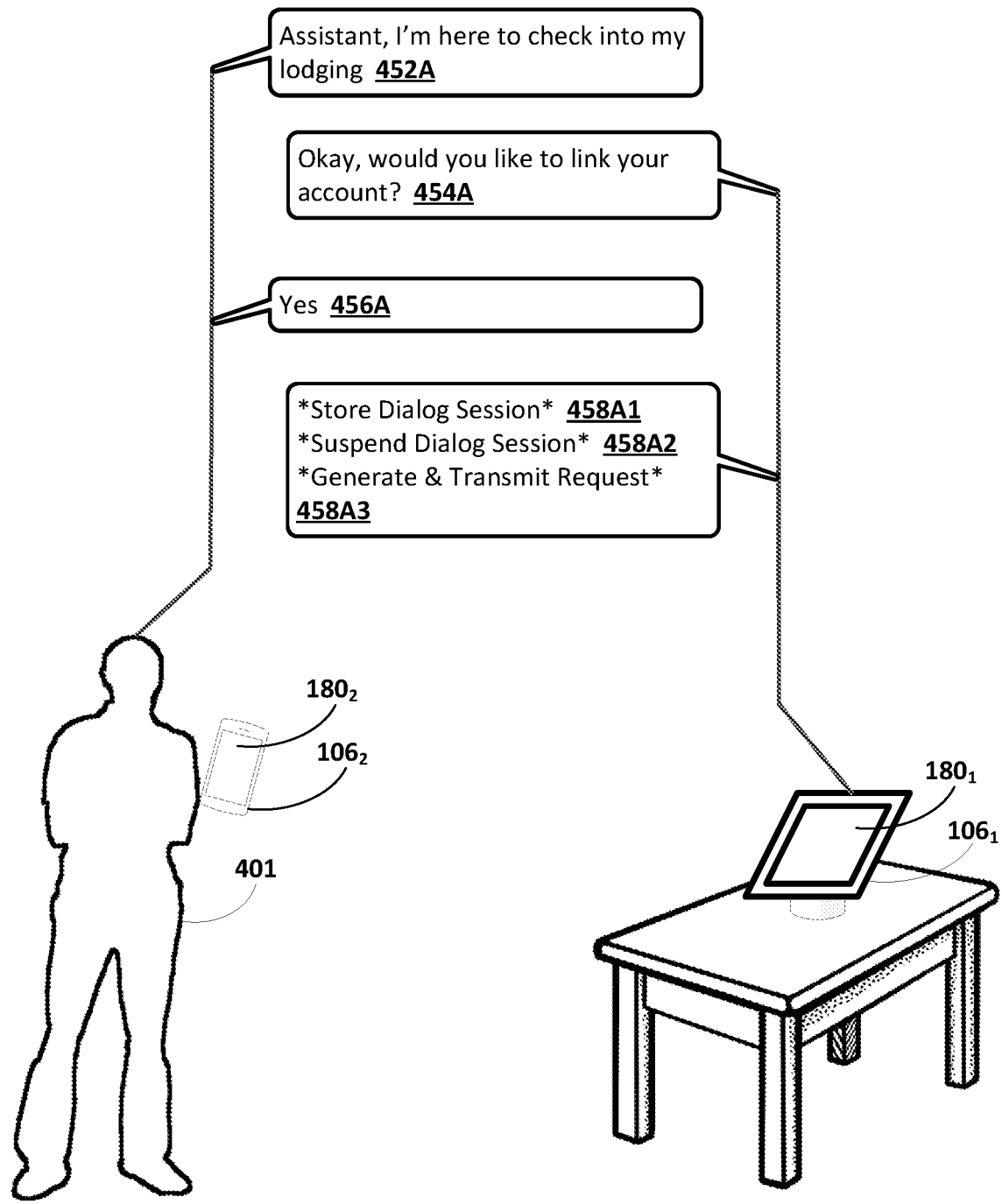
FIG. 4A, FIG. 4B, and FIG. 4C illustrate an example dialog session between a user and an automated assistant, in accordance with various implementations.
Figure 4B:
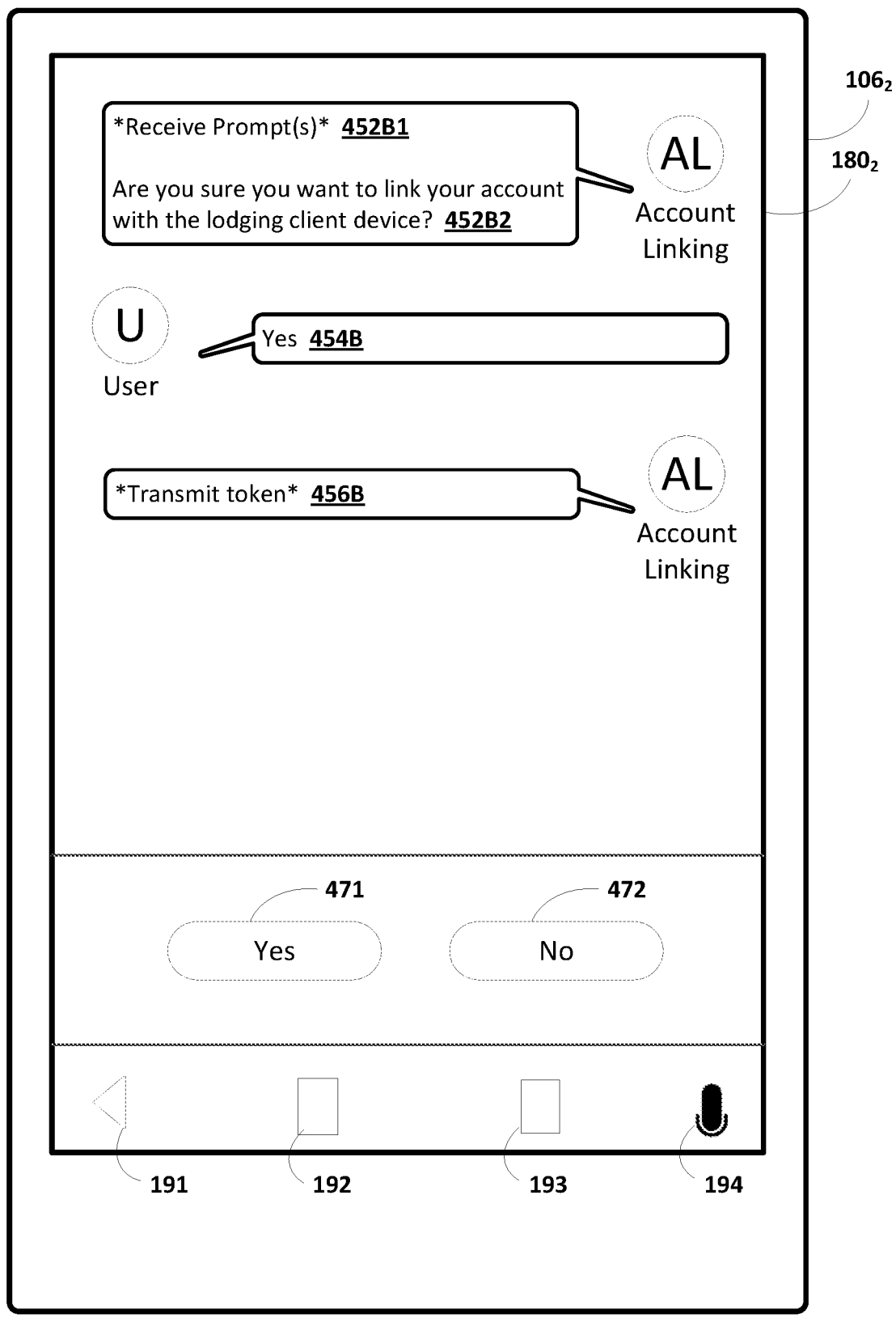
Figure 4C:
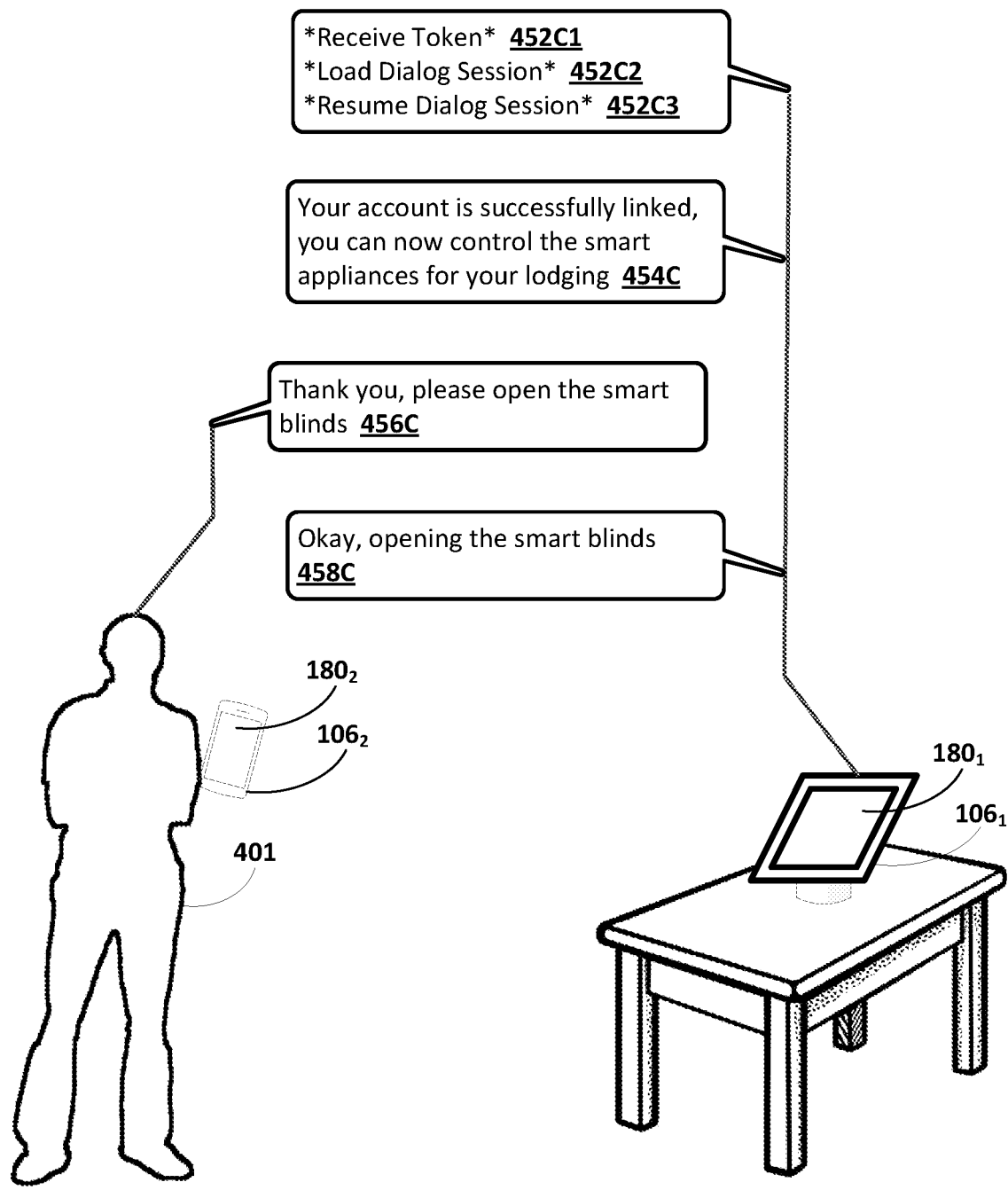

Turning now to FIGS. 4A, 4B, and 4C, an example dialog session between a user 401 and the automated assistant 120 is depicted. The automated assistant 120 can implement a token engine(s) (e.g., the token engine(s) 130 of FIG. 1) locally at one or more of the client devices $106_{1-2}$ and/or remotely at one or more servers in communication with one or more of the client devices $106_{1-2}$ over network(s) (e.g., as described with respect to network $110_2$ of FIG. 1) to suspend and resume the dialog session in response to determining that user input received during the dialog session requires a user interaction with a non-assistant platform that is distinct from an automated assistant platform by which the dialog session takes place.

The client device $106_1$ depicted in FIGS. 4A and 4C may include various user interface components including, for example, microphone(s) to generate audio data based on spoken utterances and/or other audible input, speaker(s) to audibly render synthesized speech and/or other audible output, and a display $180_1$ to receive touch input and/or to visually render transcriptions and/or other visual output. The client device $106_2$ depicted in FIGS. 4A, 4B, and 4C may include various user interface components including, for example, microphone(s) to generate audio data based on spoken utterances and/or other audible input, speaker(s) to audibly render synthesized speech and/or other audible output, and a display $180_2$ to receive touch input and/or to visually render transcriptions and/or other visual output.

Further, the display $180_2$ of the client device $106_2$ includes various system interface elements 191, 192, and 193 (e.g., hardware and/or software interface elements) that may be interacted with by the user 401 to cause the client device $106_2$ to perform one or more actions. The display $180_2$ of the client device $106_2$ enables the user 401 to interact with content rendered on the display $180_2$ by touch input (e.g., by directing user input to the display $180_2$ or portions thereof) and/or by spoken input (e.g., by selecting microphone interface element 194—or just by speaking without necessarily selecting the microphone interface element 194 (i.e., the automated assistant 120 may monitor for one or more terms or phrases, gesture(s) gaze(s), mouth movement(s), lip movement(s), and/or other conditions to activate spoken input) at the client device $106_2$).

Referring specifically to FIG. 4A, assume that the user 401 has arrived at a lodging location, such as a hotel, a vacation rental, a timeshare, and/or any other form of temporary lodging. In some implementations, the automated assistant 120 may initiate a dialog session with the user upon detecting the user's presence (e.g., via presence sensors 105 of FIG. 1), whereas in other implementations, the dialog session may be initiated in response user input being received at the client device $106_1$. AS depicted in FIG. 4A, further assume that, upon arrival, the client device $106_1$ receives a spoken utterance 452A of "Assistant, I'm here to check into my lodging" from the user 401 to initiate a dialog session. The automated assistant 120 can cause the client device $106_1$ to audibly render synthesized speech 454A of "Okay, would you like to link your account?", and user 401 may response with an additional spoken utterance 456A of "Yes". The automated assistant 120 may determine that the additional spoken utterance 456A requires a user interaction with a non-assistant platform that is in addition to an automated assistant platform currently being utilized during the dialog session of FIG. 4A based on the additional spoken utterance 456A indicating that the user 401 would like to link a user account of the user 401 with the client device $106_1$, thus associating the user 401 with the client device $106_1$. The non-assistant platform can include, for example, a web-based platform (e.g., a web browser), an application-based platform (e.g., an IoT device application, a navigation application, an electronic mail application), and/or any other platform that is distinct from the automated assistant platform currently being utilized during the dialog session of FIG. 4A. In some implementations, the non-assistant may be a first-party platform that shares a common publisher with the automated assistant 120, whereas in other implementations, the non-assistant platform may be a third-party platform that does not share a common publisher with the automated assistant 120.

In response to determining that the spoken utterance 456A requires the user interaction with the non-assistant platform, the automated assistant 120 can store a state of the dialog session as indicated by 458A1, suspend the dialog session as indicated by 458A2, and/or generate and transmit a request to the non-assistant platform and/or the token engine(s) 130 as indicated by 458A3. For example, the automated assistant 120 can store a state of the dialog session of FIG. 4A in one or more databases (e.g., the dialog state database 115 of FIG. 1). The state of the dialog session can include, for example, the spoken utterances 452A and 456A, the synthesized speech 454A, context information associated with the dialog session (e.g., a location of the user (and optionally within a home or dwelling), a time that the dialog session was initiated and/or suspended, a duration of the dialog session), and/or other data associated with the dialog session. Further, the automated assistant 120 can suspend the dialog session by deactivating one or more components of the client device $106_1$ (e.g., deactivating speech detection, natural language processing, and/or other components) until the dialog session is resumed at the client device $106_1$, display one or more visual indications related to the user interaction to be performed by the non-assistant platform (e.g., "please link your account using your mobile device"), and/or provide other indications related to the dialog session. Notably, while the dialog session is suspended, the client device $106_1$ may still be utilized to perform other assistant-related actions including, for example, initiating other dialog sessions with the user 401 and/or performing other actions (e.g., playing music, providing weather or search results, and so on) on behalf of the user 401. Moreover, the automated assistant 120 can generate a request to be transmitted to the non-assistant platform. For instance, the automated assistant 120 can identify the non-assistant platform that is required to perform the user interaction (e.g., a platform associated with account linking in FIG. 4A), generate a request that includes user information stored in one or more databases (e.g., a user ID associated with the user 401, a client ID associated with the client device $106_2$ detected over one or more network(s) 110, and/or other user information stored in the user information database 135), and transmit the request to the non-assistant platform and/or the token engine(s).

In some implementations, the token engine(s) 130 and/or the non-assistant platform can process the received request to generate one or more prompts to complete the user interaction. In some implementations where the non-assistant platform required to complete the user interaction is a third-party platform, the request may be directly transmitted to the third-party platform, such that the third-party platform can generate the one or more prompts. In other implementations where the non-assistant platform required to complete the user interaction is a third-party platform, the request may be transmitted to the third-party platform, such that the third-party platform can generate the one or more prompts. In implementations where the non-assistant platform required to complete the user interaction is a first-party platform, the request may be transmitted to the first-party platform The one or more prompts can be generated based on, for example, the synthesized speech 454A and/or the additional spoken utterance 456A that indicates the user 401 would like to link a user account with the client device 106₁. Further, the one or more prompts can be transmitted as, for example, an electronic communication (e.g., a text message, an instant message, an email, and so on) associated with the non-assistant platform, a software application notification from a software application associated with the non-assistant platform, as part of data sent to an application programing interface associated with the non-assistant platform, and/or other representations. Notably, in these implementations the request transmitted from the client device 106₁ indirectly causes one or more of the prompts to be rendered at the client device 106₂.

The non-assistant platform can cause the client device 106₁ and/or the client device 106₂ to render one or more of the prompts to complete the user interaction via the non-assistant platform. For example, and referring now to FIG. 4B, an account linking platform that is distinct from the automated assistant platform utilized in the dialog session of FIG. 4A can generate and/or receive one or more of the prompts as indicated by 452B1. As shown in FIG. 4B, the account linking platform can cause a given prompt 452B2 of "Are you sure you want you link your account with the lodging client device?" to be rendered at the display 180₂ of the client device 106₂ (visually and optionally audibly). Assume that a user response 454B of "Yes" is received in response to the non-assistant platform causing the prompt 452B2 to be rendered. The response 454B can be based on, for example, touch input directed to a first selectable element 471 of "Yes" (among multiple selectable elements that also include at least a second selectable element 472 of "No" to prevent linking of the account), a spoken utterance of "Yes" (or another utterance to confirm the account linking) received responsive to a selection of the microphone interface element 194, and/or typed input of "Yes" (or other typed input to confirm the account linking) received via the display 180₂. In various implementations, the one or more prompts may additionally or alternatively request biometric information of the user 401. The biometric information may include, for example, fingerprint identification of a fingerprint associated with the user 401 that is detected via a fingerprint scanner of the client device 106₁, voice identification of a voice associated with the user 401 that is detected via one or more microphones of the client device 106₁, face identification of a face associated with the user 401 that is detected via one or more vision components of the client device 106₁, and/or other biometric information.

In some implementations, the non-assistant platform that is distinct from the automated assistant 120 can generate a token associated with the user interaction, and transmit the token to the token(s) engine 130, the client device 106₁, and/or an additional client device not depicted. In some additional or alternative implementations, the non-assistant platform for transmit a result of the user interaction to the token(s) engine 130 to generate the token associated with the user interaction, and the token(s) engine can transmit the token to the client device 106₁, and/or an additional client device not depicted. In these implementations, the token can be, for example, a data object that includes a result of the user interaction completed via the non-assistant platform, one or more values associated with the user interaction, and/or other information provided by the non-assistant platform. For example, in the example of FIG. 4B, the token may indicate that the user granted permission to link a user account of the user 401 with the client device 106₁. Notably, in various implementations, the dialog session may not be resumed at the client device 106₁ (or any of the other client devices 106) until the token is received. Thus, the token may be required to advance the dialog session past the stored state of the dialog session.

Referring specifically to FIG. 4C, the client device 106₁ may receive the token from the token engine(s) 130 and/or the non-assistant platform as indicated by 452A1 (and optionally store the token in association with the state of the dialog session (e.g., in the dialog state database 115 of FIG. 1)). Further, the client device 106₁ may load the stored dialog session (e.g., from FIG. 4A) as indicated by 452C2, and resume the dialog session as indicated by 452C3 based on the loaded dialog session and the received token. In some implementations, the dialog session may be automatically resumed at the client device 106₁ in response to receiving the token. For example, the dialog session of FIG. 4A may be suspended at the client device 106₁ in response to receiving the spoken utterance 456A that requires the user interaction with the non-assistant platform, and remain suspended until the user interaction is completed at the client device 106₂. When the user interaction is completed at the client device 106₂, the suspended dialog session may be resumed at the client device 106₁. For instance, additional synthesized speech 454C of "Your account is successfully linked, you can now control the smart appliances for your lodging" may be rendered at the client device 106₂, the user may provide a spoken utterance 456C of "Thank you, please open the smart blinds", and the automated assistant may render further additional synthesized speech 458C of "Okay, opening the smart blinds" and actuate the smart blinds to an open position. Notably, the synthesized speech may also include a list of smart appliances that the user 401 can control. For instance, the user 401 may be able to control a smart alarm, a smart coffee maker, and a smart TV associated with the lodging, but not a smart thermostat associated with the lodging. In some versions of those implementations, the dialog session may only be resumed if the user 401 is present near the client device 106₂ (e.g., determined based on the presence sensors 105 of the client device 106₁).

In some additional or alternative implementations, the dialog session may be resumed at the client device 106₁ in response receiving user input to resume the dialog session subsequent to receiving the token. For instance, the dialog session of FIG. 4A may be suspended at the client device 106₁ in response to receiving the spoken utterance 456A that requires the user interaction with the non-assistant platform, and remain suspended until the user interaction is completed at the client device $106_2$. When the user interaction is completed at the client device $106_2$, the client device $106_1$ may provide an indication that the token was received (e.g., an audible indication and/or a graphical element). However, the dialog session may not be resumed until the user input to resume the dialog is received. For example, in implementations where the client device $106_1$ includes the display $180_1$, a selectable graphical element can be displayed and that, when selected by the user 401, causes the dialog session to be resumed at the client device $106_1$. As another example, the client device $106_1$ may receive a spoken utterance that resumes the dialog session (e.g., "resume", "continue", and so on). In these examples, speech processing of the spoken utterance (e.g., using the natural language processor 122 of FIG. 1) may be biased towards spoken utterances that resume the dialog if the token has been received at the client device $106_1$.

It should be noted that the resumption of the dialog session in FIG. 4C may differ based on the token(s) received at the client device $106_1$. For example, the user 401 may also be prompted to enter membership information associated with the lodging, and the user may be able to control different smart devices based on a membership status of the user with the lodging. For instance, if the user 401 is a platinum member with the lodging service described with respect to FIGS. 4A, 4B, and 4C, then the user 401 may be able to control every smart device included in the lodging (e.g., smart television, smart blinds, smart coffee maker, smart thermostat, etc.). However, if the user 401 is only a bronze member with the lodging service described with respect to FIGS. 4A, 4B, and 4C, then the user 401 may only be able to control certain smart devices included in the lodging (e.g., the smart television, the smart blinds, and the smart coffee maker, but not the smart thermostat). In other words, resuming the dialog session based on the token(s) may not simply be authentication and/or verification. Rather, the dialog session, upon resumption, may be steered in different directions by the automated assistant 120 based on the token(s) that are received.

Although the example of FIGS. 4A, 4B, and 4C are described herein with respect to the user 401 linking an account with the client device $106_1$, it should be understood that is for the sake of example and is not meant to be limiting. For example, the techniques described herein can be utilized to enter or verify payment information associated with the lodging when checking in, to verify purchases charged to the lodging when checking out, to add specific values associated with tipping a human operator of the lodging for services rendered. In these examples, the non-assistant platform may be a software application associated with a bank of the user 401, a software application associated with a provider of the lodging, an email account of the user that received the prompt for the user to verify the payment information, and so on.

Further, although the client device $106_1$ depicted in FIGS. 4A and 4C is a standalone client device having a display and the client device $106_2$ is depicted in FIGS. 4A, 4B, and 4C is a mobile device of the user 401, it should be understood that is for the sake of example and is not meant to be limiting. For example, the client devices $106_{1-2}$ may be other client devices including, for example, a standalone speaker without a display, a home automation or Internet of Things (IoT) device, a vehicular client system, a laptop, a computer, and/or any other device capable of engaging in a human-to-computer dialog session with the user 401. Yet further, although particular interactions are illustrated in FIGS. 4A, 4B, and 4C as being voice-based interactions or touch-based interactions, it should be understood that is for the sake of example and is not meant to be limiting. For example, the voice-based interactions of the dialog sessions depicted in FIGS. 4A and 4C may be typed interactions between the user 401 and the automated assistant 120 and via the client device $106_1$. As another example, the touch-based interactions between the user 401 and the non-assistant platform depicted in FIG. 4B may be a voice-based interaction. As yet another example, any of the interactions depicted in FIGS. 4A, 4B, and 4C may be typed-based interactions via a virtual keyboard and/or hardware keyboards.

Moreover, although the user interaction with the non-assistant platform depicted in FIG. 4B is performed using the client device $106_2$, it should be understood that is also for the sake of example and is not meant to be limiting. In various implementations, the dialog session and the user interaction with the non-assistant platform may both be performed via the client device $106_1$ or both may be performed via the client device $106_2$. In various implementations, the automated assistant 120 may determine which of the client devices 106 to utilize in completing the user interaction that requires the non-assistant platform based on capabilities of the client devices 106. For example, assume that the client device $106_1$ is a standalone speaker device capable of implementing the automated assistant platform, but lacks a display, and further assume that the client device $106_2$ is a mobile device of the user 401. In this example, the automated assistant 120 can cause the user interaction to be completed at the client device $106_2$ to leverage the capabilities of the touchscreen display $180_2$. In contrast, assume the client device $106_1$ includes the touchscreen display $180_1$. In some of these examples, the automated assistant 120 can cause the user interaction to be completed at the client device $106_1$ since the client device $106_1$ includes the touchscreen display $180_2$.

Figure 5A:
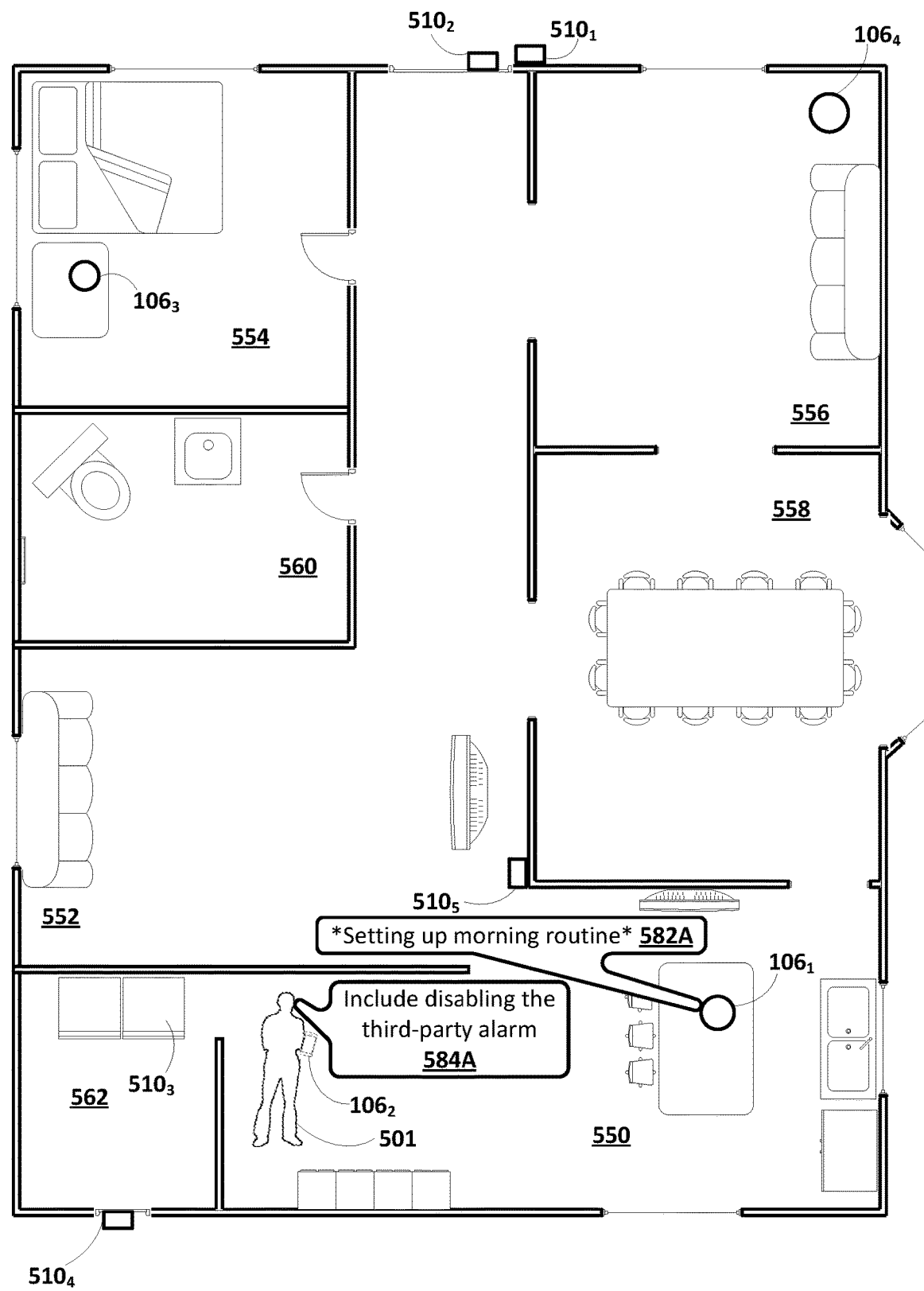
FIG. 5A, FIG. 5B, and FIG. 5C illustrate another example dialog session between a user and an automated assistant, in accordance with various implementations.
Figure 5B:
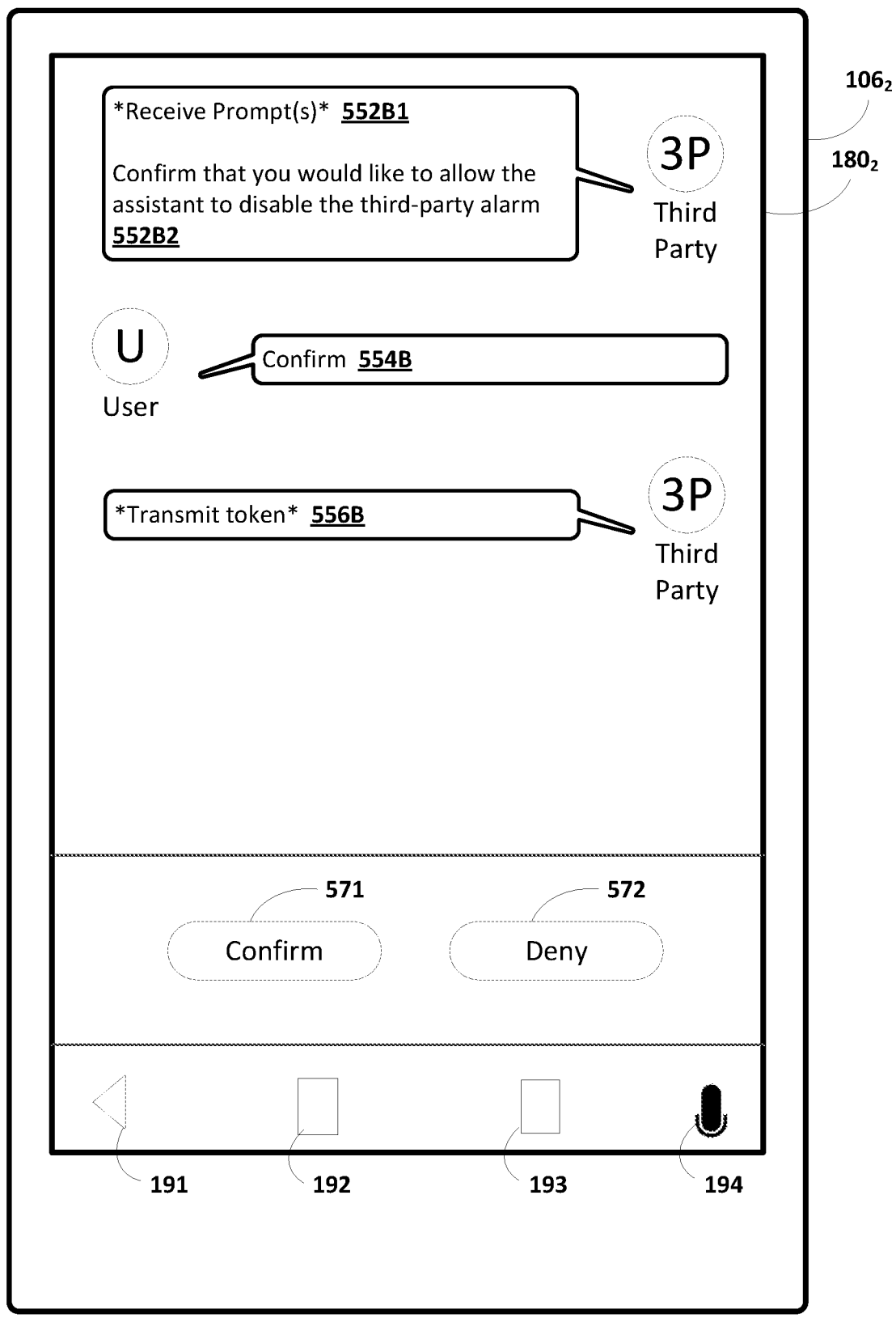
Figure 5C:
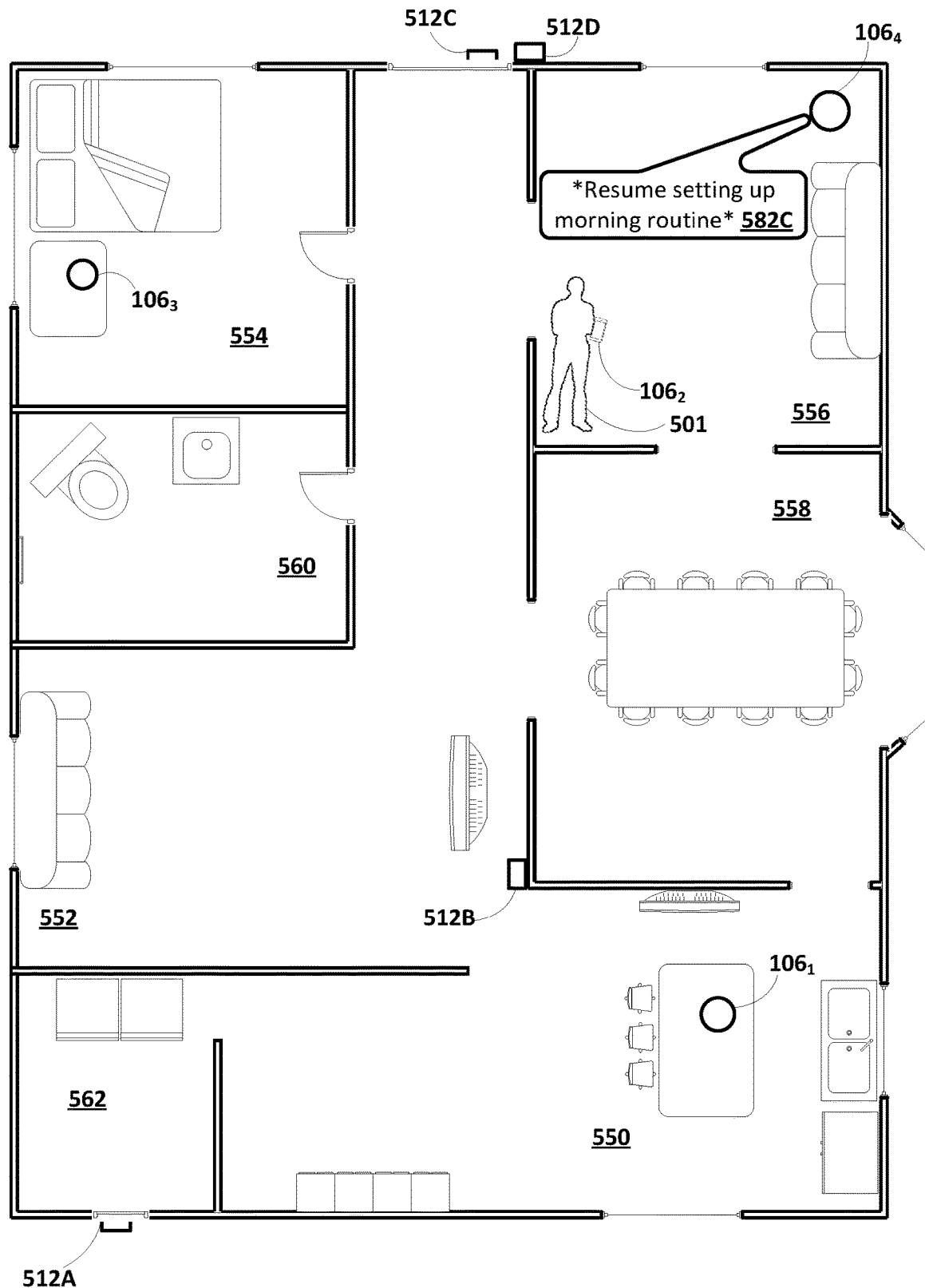

Turning now to FIGS. 5A, 5B, and 5C, another example dialog session between a user and an automated assistant is depicted. A home floorplan is depicted in FIGS. 5A and 5C. The depicted floorplan includes a plurality of rooms, 550-562. A plurality of client devices $106_{1-4}$ are deployed throughout at least some of the rooms (e.g., from among the client devices $106_{1-4}$ of FIG. 1). Each of the client devices 506 may implement a respective instance of an automated assistant client (e.g., the automated assistant client 118 of FIG. 1) configured with selected aspects of the present disclosure and may include one or more user interface components (e.g., the user interface component(s) 107 of FIG. 1), such as microphone(s) that are capable of capturing utterances spoken by a person nearby, speaker(s) that are capable of audibly rendering synthesized speech, display(s) that are capable of visually rendering visual content, and/or other user interface components. For example, a first client device $106_1$ taking the form of a standalone interactive speaker that lacks a display is deployed in room 550, which in this example is a kitchen. A second client device $106_2$ taking the form of a mobile device is being held by a user 501 (e.g., the same or similar client device $106_2$ depicted in FIGS. 4A, 4B, and 4C and described with respect to FIG. 5B), who is located in the kitchen in FIG. 5A and a living room in FIG. 5C, and is described with respect to FIG. 5B. A third client device $106_3$ taking the form of an interactive standalone speaker is deployed in room 554, which in this example is a bedroom. A fourth client device $106_4$ taking the form of another interactive standalone speaker is deployed in room 556, which in this example is the living room.

While not depicted in FIGS. 5A, 5B, and 5C, the plurality of client devices 106 may be communicatively coupled with each other and/or other resources (e.g., the Internet) via one or more wired or wireless LANs (e.g., as described with respect to $110_1$ in FIG. 1). Additionally, other client devices—particularly other smart phones, tablets, laptops, wearable devices, etc.—may also be present, e.g., carried by one or more persons in the home and may or may not also be connected to the same LAN. It should be understood that the configuration of client devices 106 depicted in FIGS. 5A, 5B, and 5C is just one example; more or fewer and/or different client devices 106 may be deployed across any number of other rooms and/or areas other than a home.

Further depicted in the home floorplan of FIGS. 5A and 5C are a plurality of IoT devices $510_{1-4}$. For example, a first IoT device $510_1$ taking the form of a smart doorbell is deployed on the exterior of the home near a front door of the home. A second IoT device $510_2$ taking the form of a smart third-party alarm coupled to the front door of the home. A third IoT device $510_3$ taking the form of a smart clothes washer is deployed in room 562, which in this example is a laundry room. A fourth IoT device $510_4$ taking the form of an additional smart third-party alarm coupled to the rear door of the home. A fifth IoT device $510_5$ taking the form of a smart thermostat is deployed in room 552, which in this example is a den.

Each of the IoT devices 510 can communicate (e.g., via the Internet) with a respective IoT-based platform to provide data to the IoT-based platform and optionally to be controlled based on commands provided by the IoT-based platform that are responsive to user input detected at one or more of the client device 106. It should be understood that the configuration of the IoT devices 510 depicted in FIGS. 5A, 5B, and 5C is just one example; more or fewer and/or different IoT devices 510 may be deployed across any number of other rooms and/or areas other than a home.

Referring specifically to FIG. 5A, assume the user 501 is engaged in a dialog session with the client device $106_1$, via an automated assistant platform, to set up a morning routine as indicated by 582A that causes multiple assistant-based actions to be performed when invoked (typically in the morning) using one or more trigger terms or phrases (e.g., "Assistant, good morning", "Tell me about my morning", etc.). Further assume the user 501 provides a spoken utterance 584A of "Include disabling the third-party alarm" in the morning routine (e.g., the third-party alarm $510_2$ and the additional third-party alarm $510_4$). In response to determining that the spoken utterance 584A requires a user interaction with a non-assistant platform (e.g., a third-party platform associated with the third-party alarm $510_2$ and the additional third-party alarm $510_4$), the automated assistant can store a state of the dialog session, suspend the dialog session, and/or generate and transmit a request to the non-assistant platform and/or the token engine(s) 130 (e.g., as described above with respect to FIG. 4A). The non-assistant platform and/or the token engine(s) 130 can generate one or more prompts to complete the user interaction, and cause the one or more prompts to be rendered at the client device $106_2$ (e.g., as described above with respect to FIG. 4A). For example, the one or more prompts may be rendered at the client device $106_2$ in response to determining that the one or more prompts require a display, but that the client device $106_1$ lacks a display.

For example, and referring specifically to FIG. 5B, a third-party platform associated with the third-party alarm $510_2$ and/or the additional third-party alarm $510_4$ that is distinct from the automated assistant platform utilized in the dialog session of FIG. 5A can generate and/or receive one or more of the prompts as indicated by 552B1. As shown in FIG. 5B, the third-party platform associated with the third-party alarm $510_2$ and/or the additional third-party alarm $510_4$ can cause a given prompt 552B2 of "Confirm that you would like to allow the assistant to disable the third-party alarm" to be rendered at the display $180_2$ of the client device $106_2$ (visually and optionally audibly). Assume that a user response 554B of "Confirm" is received in response to the non-assistant platform causing the prompt 552B2 to be rendered. The response 554B can be based on, for example, touch input directed to a first selectable element 571 of "Confirm" (among multiple selectable elements that also include at least a second selectable element 572 of "Deny" to prevent linking of the account), a spoken utterance of "Confirm" (or another utterance to confirm the assistant can control the third-party alarm) received responsive to a selection of the microphone interface element 194, and/or typed input of "Confirm" (or other typed input to confirm the assistant can control the third-party alarm) received via the display $180_2$. In various implementations, the one or more prompts may additionally or alternatively request biometric information of the user 401. The biometric information may include, for example, fingerprint identification of a fingerprint associated with the user 401 that is detected via a fingerprint scanner of the client device $106_1$, voice identification of a voice associated with the user 401 that is detected via one or more microphones of the client device $106_1$, face identification of a face associated with the user 401 that is detected via one or more vision components of the client device $106_1$ and/or other biometric information.

In some implementations, the non-assistant platform that is distinct from the automated assistant 120 can generate a token associated with the user interaction, and transmit the token to the token(s) engine 130, the client device $106_1$, and/or an additional client device not depicted. In some additional or alternative implementations, the non-assistant platform for transmit a result of the user interaction to the token(s) engine 130 to generate the token associated with the user interaction, and the token(s) engine can transmit the token to the client device $106_1$, and/or an additional client device not depicted. In these implementations, the token can be, for example, a data object that includes a result of the user interaction completed via the non-assistant platform. For example, in the example of FIG. 5B, the token may indicate that the user confirmed that the automated assistant can control the third-party alarm. Notably, in various implementations, the dialog session may not be resumed at the client device $106_1$ (or any of the other client devices 106) until the token is received. Thus, the token may be required to advance the dialog session past the stored state of the dialog session.

Referring specifically to FIG. 5C, the client device $106_4$ may receive the token from the token engine(s) 130 and/or the non-assistant platform (and optionally store the token in association with the state of the dialog session (e.g., in the dialog state database 115 of FIG. 1)). Further, the client device $106_4$ may load the stored dialog session (e.g., from FIG. 5A and over one or more of the networks $110_1$ of FIG. 1), and resume the dialog session based on the loaded dialog session and the received token. As a result, the user 501 and the automated assistant may resume setting up the morning routine as indicated by 582C. Notably, the client device $106_4$ depicted in FIG. 4C at which the dialog session is resumed is distinct from the client device $106_1$ depicted in FIG. 4A at which the dialog session was suspended. In various implementations, the dialog session may be resumed at a given one of the client device 106 that the user 501 is nearest (e.g., determined based on presence sensor data generated by the presence sensors 105) when the user interaction is completed. For example, assume the user 501 walks from room 550 as shown in FIG. 5A, which in this example is a kitchen, to room 556 as shown in FIG. 5C, which in this example is a living room, while the user interaction of FIG. 5B is completed via the client device $106_2$. This allows the user to roam freely about the house depicted in FIGS. 5A and 5C while setting up the morning routine.

In some implementations, the dialog session may be automatically resumed at the client device $106_4$ in response to receiving the token (e.g., as described above with respect to FIG. 4A). For example, the dialog session of FIG. 5A may be suspended at the client device $106_1$ in response to receiving the spoken utterance 584A that requires the user interaction with the non-assistant platform, and remain suspended until the user interaction is completed at the client device $106_2$. When the user interaction is completed at the client device $106_2$, the suspended dialog session may be resumed at the client device $106_4$ based on the user being present at the client device $106_4$. In some additional or alternative implementations, the dialog session may be resumed at the client device $106_4$ in response receiving user input (at the client device $106_4$) to resume the dialog session subsequent to receiving the token (e.g., as described above with respect to FIG. 4A). For instance, the dialog session of FIG. 5A may be suspended at the client device $106_1$ in response to receiving the spoken utterance 584A that requires the user interaction with the non-assistant platform, and remain suspended until the user interaction is completed at the client device $106_2$. When the user interaction is completed at the client device $106_2$, one or more of the client devices 106 in the house may provide an indication that the token was received (e.g., an audible indication and/or a graphical element). However, the dialog session may not be resumed until the user input to resume the dialog is received.

Although particular client devices 106 are depicted in FIGS. 5A, 5B, and 5C, it should be understood that is for the sake of example and is not meant to be limiting. For example, the client devices 106 may be other client devices including, for example, a standalone speaker without a display, a home automation or Internet of Things (IoT) device, a vehicular client system, a laptop, a computer, and/or any other device capable of engaging in a human-to-computer dialog session with the user 501. Yet further, although particular interactions are illustrated in FIGS. 5A, 5B, and 5C as being voice-based interactions or touch-based interactions, it should be understood that is for the sake of example and is not meant to be limiting.

Moreover, although the user interaction with the non-assistant platform depicted in FIG. 5B is performed using the client device $106_1$, it should be understood that is also for the sake of example and is not meant to be limiting. In various implementations, the dialog session and the user interaction with the non-assistant platform may both be performed via the client device $106_1$ or both may be performed via the client device $106_2$. In various implementations, the automated assistant 120 may determine which of the client devices 106 to utilize in completing the user interaction that requires the non-assistant platform based on capabilities of the client devices 106. For example, assume that the client device $106_1$ is a standalone speaker device capable of implementing the automated assistant platform, but lacks a display as shown in FIG. 5A, and further assume that the client device $106_2$ is a mobile device of the user 501. In this example, the automated assistant 120 can cause the user interaction to be completed at the client device $106_2$ to leverage the capabilities of the touchscreen display $180_2$. In contrast, assume the client device $106_1$ includes the touchscreen display $180_1$. In some of these examples, the automated assistant 120 can cause the user interaction to be completed at the client device $106_1$ since the client device $106_1$ includes the touchscreen display $180_2$.

Figure 6:
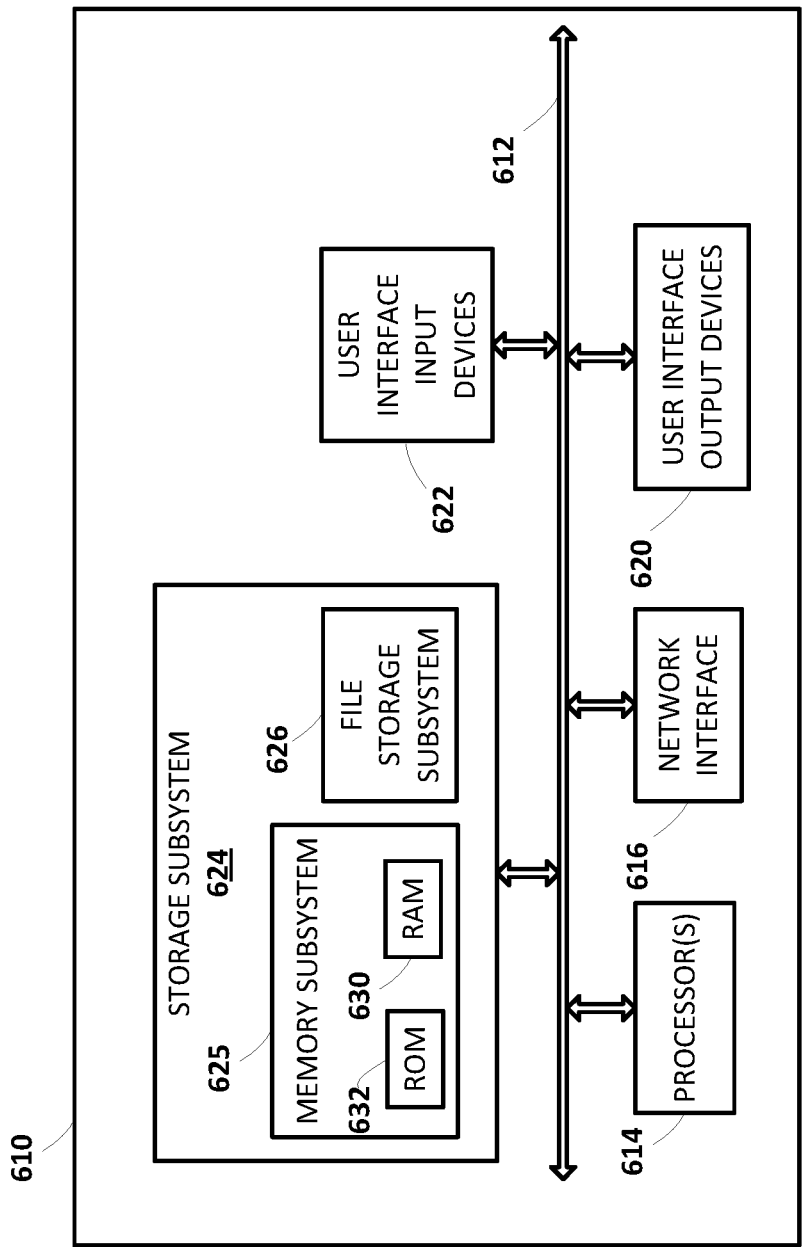
FIG. 6 illustrates an example architecture of a computing device.

Turning now to FIG. 6, a block diagram of an example computing device 610 that may optionally be utilized to perform one or more aspects of techniques described herein is depicted. In some implementations, one or more of the client devices 106, token engine(s) 130, third-party platform(s) 140, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes receiving, from a user of a client device, user input during a dialog session between the user and an automated assistant and via an automated assistant platform, and, in response to determining that the user input requires a user interaction with a non-assistant platform that is distinct from the automated assistant platform: storing, in one or more databases accessible by at least the client device, a state of the dialog session between the user and the automated assistant, transmitting, to the non-assistant platform, a request to initiate the user interaction, and receiving, from the non-assistant platform and responsive to the user completing the user interaction via the additional client device, a token associated with the user interaction. Transmitting the request to the non-assistant platform causes an additional client device of the user to render a prompt for completing the user interaction with the non-assistant platform via the additional client device. The in response to receiving the token associated with the user interaction: causing the dialog session between the user and the automated assistant to be resumed, at the client device or a further additional client device, based on the state of the dialog session and based on the token associated with the user interaction.

These and other implementations of the technology disclosed herein can include one or more of the following features.

In some implementations, the method may further include, in response to receiving the token associated with the user interaction, and prior to causing the dialog session between the user and the automated assistant to be resumed: storing, in one or more of the databases accessible by at least the client device, the token in association with the state of the dialog session between the user and the automated assistant. In some versions of those implementations, the dialog session between the user and the automated assistant to be resumed at the client device may include loading, at the client device or the further additional client device and via the automated assistant platform, the state of the dialog session between the user and the automated assistant along with an indication of the token. In some further versions of those implementations, loading the state of the dialog session along with the indication of the token at the client device or the further additional client device is responsive to receiving the token associated with the user interaction that was completed via the additional client device. In some additional or alternative versions of those further implementations, loading the state of the dialog session along with the indication of the token at the client device or the further additional client device is responsive to receiving additional user input, from the user of the client device, to resume the dialog session.

In some implementations, the method may further include, subsequent to storing the state of the dialog session between the user and the automated assistant: causing the dialog session between the user and the automated assistant to be suspended.

In some implementations, in response to determining that the user input requires a user interaction with a non-assistant platform that is distinct from the automated assistant platform, the method may further include determining whether the client device is capable of facilitating the user interaction with the non-assistant platform. Transmitting the request to initiate the user interaction to the additional client device may be in response to determining that the client device is not capable of facilitating the user interaction with the non-assistant platform.

In some implementations, the automated assistant may be accessible at each of the client device, the additional client device, and the further additional client device. The additional client device may be in addition to the client device and the further additional client device, and the further additional client device may be in addition to the client device and the additional client device. In some versions of those implementations, the client device and the further additional client device may be corresponding standalone automated assistant devices associated with the user, and the additional client device may be a mobile device associated with the user.

In some implementations, the non-assistant platform may be an authentication platform or authorization platform that has a common publisher with the automated assistant platform. In some versions of those implementations, the non-assistant platform may be a third-party platform that does not have the common publisher with the automated assistant platform.

In some implementations, the non-assistant platform may cause the additional client device of the user to render the prompt for completing the user interaction with the non-assistant platform responsive to receiving the request and via the additional client device.

In some implementations, a method implemented by one or more processors is provided, and includes receiving, from a client device of a user, a request to initiate a user interaction with a non-assistant platform, the non-assistant platform being distinct from an automated assistant platform that is being utilized during a dialog session between the user and an automated assistant that is accessible at the client device, and the request being received responsive to determining user input received during the dialog session requires the user interaction with the non-assistant platform that is distinct from the automated assistant platform. The method further includes, in response to receiving the request from the client device: causing rendering, at an additional client device of the user, of a prompt for completing the user interaction with the non-assistant platform via the additional client device, and generating a token associated with the user interaction that was completed via the additional client device. Generating the token is based on user input that is received from the user of the additional client device responsive to rendering the prompt. The method may further include, in response to generating the token associated with the user interaction: transmitting, to the client device of the user, the token associated with the user interaction. Transmitting the token associated with the user interaction causes the client device of the user to store the token in association with a stored state of the dialog session between the user and the automated assistant.

These and other implementations of the technology disclosed herein can include one or more of the following features.

In some implementations, transmitting the token associated with the user interaction may further cause the client device of the user to load, at the client device via the automated assistant platform, the state of the dialog session between the user and the automated assistant at the client device along with an indication of the token. In some versions of those implementations, loading the state of the dialog session along with the indication of the token at the client device may be responsive to causing the client device to store the token associated with the user interaction that was completed. In some additional or alternative versions of those implementations, loading the state of the dialog session along with the indication of the token at the client device may be responsive to receiving additional user input, from the user of the client device, to resume the dialog session.

In some implementations, the dialog session may be suspended at the client device in response to determining the user input received during the dialog session requires the user interaction with the non-assistant platform that is distinct from the automated assistant platform.

In some implementations, the automated assistant may be accessible at each of the client device, the additional client device, and the further additional client device. The additional client device may be in addition to the client device and the further additional client device, and the further additional client device may be in addition to the client device and the additional client device. In some versions of those implementations, the one or more processors may be of the additional client device.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer-readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
receiving, from a user of a client device, user input during an ongoing dialog session between the user and a first-party automated assistant and via a first-party automated assistant platform, the first-party automated assistant and the first-party automated assistant platform being controlled by a first-party entity, the first-party automated assistant and the first-party automated assistant platform being implemented by the client device, the ongoing dialog session being associated with setting up a routine to be performed by the first-party automated assistant, and the routine, when invoked using one or more trigger terms or phrases for the routine, causes multiple assistant-based actions to be performed by the first-party automated assistant;
determining that the user input requires a user interaction with a third-party non-assistant platform, the third-party non-assistant platform being controlled by a third-party entity, and the third-party entity being distinct from the first-party entity;
in response to determining that the user input requires the user interaction with the third-party non-assistant platform:
storing, in one or more databases accessible by at least the client device, a state of the ongoing dialog session between the user and the first-party automated assistant,
subsequent to storing the state of the ongoing dialog session between the user and the first-party automated assistant, causing the ongoing dialog session between the user and the first-party automated assistant to be suspended,
transmitting, to the third-party non-assistant platform, a request to initiate the user interaction, wherein transmitting the request to the third-party non-assistant platform causes an additional client device of the user to render a prompt for completing the user interaction with the third-party non-assistant platform that is implemented by the additional client device, and
receiving, from the third-party non-assistant platform and responsive to the user completing the user interaction via the additional client device, a token associated with the user interaction;

in response to receiving the token associated with the user interaction:
  causing the suspended ongoing dialog session between the user and the first-party automated assistant to be resumed, at the client device or a further additional client device, based on the stored state of the suspended ongoing dialog session and based on the token associated with the user interaction, wherein causing the suspended ongoing dialog session between the user and the first-party automated assistant to be resumed based on the stored state of the suspended ongoing dialog session and based on the token associated with the user interaction comprises:
    causing the suspended ongoing dialog session between the user and the first-party automated assistant to be resumed at a given state that is progressed beyond the stored state of the suspended ongoing dialog session, that is based on the token associated with the user interaction, and that continues setting up the routine to be performed by the first-party automated assistant; and
  subsequent to setting up the routine to be performed by the first-party automated assistant:
    receiving, from the user of the client device, audio data that includes the one or more trigger terms or phrases; and
    in response to receiving the audio data that includes the one or more trigger terms or phrases:
      causing the first-party automated assistant to cause the multiple assistant-based actions to be performed.

2. The method of claim 1, in response to determining that the user input requires the user interaction with the third-party non-assistant platform, further comprising:
  determining whether the client device is capable of facilitating the user interaction with the third-party non-assistant platform; and
  wherein transmitting the request to initiate the user interaction to the additional client device is in response to determining that the client device is not capable of facilitating the user interaction with the third-party non-assistant platform.

3. The method of claim 1, wherein the third-party non-assistant platform, that is controlled by the third-party entity, causes the additional client device of the user to render the prompt for completing the user interaction with the third-party non-assistant platform responsive to receiving the request and via the additional client device.

4. The method of claim 1, wherein the first-party automated assistant is accessible at each of the client device, the additional client device, and the further additional client device, wherein the additional client device is in addition to the client device and the further additional client device, and wherein the further additional client device is in addition to the client device and the additional client device.

5. The method of claim 4, wherein the client device and the further additional client device are corresponding stand-alone automated assistant devices associated with the user, and wherein the additional client device is a mobile device associated with the user.

6. The method of claim 1, further comprising:
  in response to receiving the token associated with the user interaction, and prior to causing the suspended ongoing dialog session between the user and the first-party automated assistant to be resumed:
    storing, in one or more of the databases accessible by at least the client device, the token in association with the stored state of the suspended ongoing dialog session between the user and the first-party automated assistant.

7. The method of claim 6, wherein causing the suspended ongoing dialog session between the user and the first-party automated assistant to be resumed at the client device comprises:
  loading, at the client device or the further additional client device and via the first-party automated assistant platform, the stored state of the suspended ongoing dialog session between the user and the first-party automated assistant along with an indication of the token to progress the suspended ongoing dialog session to the given state.

8. The method of claim 7, wherein loading the stored state of the suspended ongoing dialog session along with the indication of the token at the client device or the further additional client device is responsive to receiving the token associated with the user interaction that was completed via the additional client device.

9. The method of claim 7, wherein loading the stored state of the suspended ongoing dialog session along with the indication of the token at the client device or the further additional client device is responsive to receiving additional user input, from the user of the client device, to resume the suspended ongoing dialog session.

10. A system comprising:
  at least one processor; and
  at least one memory storing instructions that, when executed, cause the at least one processor to:
    receive, from a user of a client device, user input during an ongoing dialog session between the user and a first-party automated assistant and via a first-party automated assistant platform, the first-party automated assistant and the first-party automated assistant platform being controlled by a first-party entity, the first-party automated assistant and the first-party automated assistant platform being implemented by the client device, and the routine, when invoked using one or more trigger terms or phrases for the routine, causes multiple assistant-based actions to be performed by the first-party automated assistant;
    determine that the user input requires a user interaction with a third-party non-assistant platform, the third-party non-assistant platform being controlled by a third-party entity, the third-party entity being distinct from the first-party entity, and the ongoing dialog session being associated with linking a third-party account, for the third-party entity, with the first-party automated assistant;
    in response to determining that the user input requires the user interaction with the third-party non-assistant platform:
      store, in one or more databases accessible by at least the client device, a state of the ongoing dialog session between the user and the first-party automated assistant,
      subsequent to storing the state of the ongoing dialog session between the user and the first-party automated assistant, cause the ongoing dialog session between the user and the first-party automated assistant to be suspended,
      transmit, to the third-party non-assistant platform, a request to initiate the user interaction, wherein the instructions to transmit the request to the third-party non-assistant platform comprise instructions to cause an additional client device of the user to render a prompt for completing the user interaction with the third-party non-assistant platform that is implemented by the additional client device, and receive, from the third-party non-assistant platform and responsive to the user completing the user interaction via the additional client device, a token associated with the user interaction;

in response to receiving the token associated with the user interaction:

cause the suspended ongoing dialog session between the user and the first-party automated assistant to be resumed, at the client device or a further additional client device, based on the stored state of the suspended ongoing dialog session and based on the token associated with the user interaction, wherein the instructions to cause the suspended ongoing dialog session between the user and the first-party automated assistant to be resumed based on the stored state of the ongoing dialog session and based on the token associated with the user interaction comprise instructions to:

cause the suspended ongoing dialog session between the user and the first-party automated assistant to be resumed at a given state that is progressed beyond the stored state of the suspended ongoing dialog session, that is based on the token associated with the user interaction, and that enables the user to control one or more smart devices via the third-party account that is linked with the first-party automated assistant; and subsequent to setting up the routine to be performed by the first-party automated assistant:

receive, from the user of the client device, audio data that includes the one or more trigger terms or phrases; and in response to receiving the audio data that includes the one or more trigger terms or phrases:

cause the first-party automated assistant to cause the multiple assistant-based actions to be performed.

11. The system of claim 10, in response to determining that the user input requires the user interaction with the third-party non-assistant platform, wherein the instructions further cause the at least one processor to:

determine whether the client device is capable of facilitating the user interaction with the third-party non-assistant platform; and wherein transmitting the request to initiate the user interaction to the additional client device is in response to determining that the client device is not capable of facilitating the user interaction with the third-party non-assistant platform.

12. The system of claim 10, wherein the third-party non-assistant platform, that is controlled by the third-party entity, causes the additional client device of the user to render the prompt for completing the user interaction with the third-party non-assistant platform responsive to receiving the request and via the additional client device.

13. The system of claim 10, wherein the first-party automated assistant is accessible at each of the client device, the additional client device, and the further additional client device, wherein the additional client device is in addition to the client device and the further additional client device, and wherein the further additional client device is in addition to the client device and the additional client device.

14. The system of claim 13, wherein the client device and the further additional client device are corresponding stand-alone automated assistant devices associated with the user, and wherein the additional client device is a mobile device associated with the user.

15. The system of claim 10, wherein the instructions further cause the at least one processor to:

in response to receiving the token associated with the user interaction, and prior to causing the suspended ongoing dialog session between the user and the first-party automated assistant to be resumed:

store, in one or more of the databases accessible by at least the client device, the token in association with the stored state of the suspended ongoing dialog session between the user and the first-party automated assistant.

16. The system of claim 15, wherein the instructions to cause the suspended ongoing dialog session between the user and the first-party automated assistant to be resumed at the client device comprise instructions to:

load, at the client device or the further additional client device and via the first-party automated assistant platform, the stored state of the suspended ongoing dialog session between the user and the first-party automated assistant along with an indication of the token to progress the suspended ongoing dialog session to the given state.

17. The system of claim 16, wherein loading the stored state of the suspended ongoing dialog session along with the indication of the token at the client device or the further additional client device is responsive to receiving the token associated with the user interaction that was completed via the additional client device.

18. The system of claim 16, wherein loading the stored state of the suspended ongoing dialog session along with the indication of the token at the client device or the further additional client device is responsive to receiving additional user input, from the user of the client device, to resume the suspended ongoing dialog session.

19. A non-transitory computer-readable storage medium storing instructions that, when executed by at least one processor, cause the at least one processor to perform operations, the operations comprising:

receiving, from a user of a client device, user input during an ongoing dialog session between the user and a first-party automated assistant and via a first-party automated assistant platform, the first-party automated assistant and the first-party automated assistant platform being controlled by a first-party entity, the first-party automated assistant and the first-party automated assistant platform being implemented by the client device, the ongoing dialog session being associated with setting up a routine to be performed by the first-party automated assistant, and the routine, when invoked using one or more trigger terms or phrases for the routine, causes multiple assistant-based actions to be performed by the first-party automated assistant;

determining that the user input requires a user interaction with a third-party non-assistant platform, the third-party non-assistant platform being controlled by a third-party entity, and the third-party entity being distinct from the first-party entity;

in response to determining that the user input requires the user interaction with the third-party non-assistant platform:

storing, in one or more databases accessible by at least the client device, a state of the ongoing dialog session between the user and the first-party automated assistant, subsequent to storing the state of the ongoing dialog session between the user and the first-party automated assistant, causing the ongoing dialog session between the user and the first-party automated assistant to be suspended, transmitting, to the third-party non-assistant platform, a request to initiate the user interaction, wherein transmitting the request to the third-party non-assistant platform causes an additional client device of the user to render a prompt for completing the user interaction with the third-party non-assistant platform that is implemented by the additional client device, and receiving, from the third-party non-assistant platform and responsive to the user completing the user interaction via the additional client device, a token associated with the user interaction;

in response to receiving the token associated with the user interaction:

causing the suspended ongoing dialog session between the user and the first-party automated assistant to be resumed, at the client device or a further additional client device, based on the stored state of the suspended ongoing dialog session and based on the token associated with the user interaction, wherein causing the suspended ongoing dialog session between the user and the first-party automated assistant to be resumed based on the stored state of the suspended ongoing dialog session and based on the token associated with the user interaction comprises:

causing the suspended ongoing dialog session between the user and the first-party automated assistant to be resumed at a given state that is progressed beyond the stored state of the suspended ongoing dialog session, that is based on the token associated with the user interaction, and that continues setting up the routine to be performed by the first-party automated assistant; and subsequent to setting up the routine to be performed by the first-party automated assistant:

receiving, from the user of the client device, audio data that includes the one or more trigger terms or phrases; and in response to receiving the audio data that includes the one or more trigger terms or phrases:

causing the first-party automated assistant to cause the multiple assistant-based actions to be performed.

* * * * *